United States Patent
Yuasa et al.

(10) Patent No.: US 9,018,869 B2
(45) Date of Patent: Apr. 28, 2015

(54) MOTOR CONTROL DEVICE AND SEAT CONTROL DEVICE FOR VEHICLE

(75) Inventors: Daisuke Yuasa, Kariya (JP); Akira Aikawa, Aichi-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 952 days.

(21) Appl. No.: 12/858,757

(22) Filed: Aug. 18, 2010

(65) Prior Publication Data

US 2011/0043157 A1 Feb. 24, 2011

(30) Foreign Application Priority Data

Aug. 21, 2009 (JP) ................................. 2009-192576

(51) Int. Cl.
| | | |
|---|---|---|
| H02P 1/00 | (2006.01) | |
| G05B 11/28 | (2006.01) | |
| H02P 3/20 | (2006.01) | |
| H02P 5/00 | (2006.01) | |
| B60N 2/48 | (2006.01) | |
| B60N 2/02 | (2006.01) | |
| B60N 2/30 | (2006.01) | |
| B60N 2/36 | (2006.01) | |

(52) U.S. Cl.
CPC ............ *B60N 2/4855* (2013.01); *B60N 2/0232* (2013.01); *B60N 2/0252* (2013.01); *B60N 2/3031* (2013.01); *B60N 2/3065* (2013.01); *B60N 2/36* (2013.01); *B60N 2002/0272* (2013.01)

(58) Field of Classification Search
None
See application file for complete search history.

(56) References Cited

U.S. PATENT DOCUMENTS

| 4,124,101 A | 11/1978 | Satoh |
|---|---|---|
| 4,663,575 A * | 5/1987 | Juzswik et al. ............... 318/444 |
| 8,190,005 B2 * | 5/2012 | Sugie ............................ 388/811 |
| 8,380,419 B2 * | 2/2013 | Sauter ............................. 701/93 |
| 2002/0172511 A1 | 11/2002 | Saito et al. |
| 2004/0144135 A1 * | 7/2004 | Oh et al. ...................... 68/12.16 |

(Continued)

FOREIGN PATENT DOCUMENTS

| JP | S56-025432 B | 6/1981 |
|---|---|---|
| JP | 860-091884 A | 5/1985 |

(Continued)

OTHER PUBLICATIONS

Official Action issued by Japanese Patent Office on Oct. 24, 2013 in Japanese Application No. 2009-192576, and English language translation of Official Action (5 pgs).

(Continued)

*Primary Examiner* — Paul Ip
*Assistant Examiner* — Devon Joseph
(74) *Attorney, Agent, or Firm* — Buchanan Ingersoll & Rooney P.C.

(57) ABSTRACT

A motor control device includes an acceleration portion for increasing a target number of rotations of a motor every predetermined calculation cycle until the target number of rotations of the motor reaches an upper limit number of rotations, which is set on the basis of a reached position of a driven object from a reference position, the driven object is driven by the motor so that a position of the driven object is changed, a deceleration portion for decreasing the target number of rotations of the motor every calculation cycle after the target number of rotations reaches the upper limit number of rotations, and a main control portion for controlling a drive of the motor on the basis of the target number of rotations.

14 Claims, 15 Drawing Sheets

(56) References Cited

U.S. PATENT DOCUMENTS

| | | | |
|---|---|---|---|
| 2008/0178422 A1* | 7/2008 | Imai et al. | 16/57 |
| 2009/0132114 A1* | 5/2009 | Torsten | 701/36 |
| 2010/0133885 A1* | 6/2010 | Osaki | 297/311 |
| 2010/0250087 A1* | 9/2010 | Sauter | 701/93 |

FOREIGN PATENT DOCUMENTS

| | | |
|---|---|---|
| JP | S63-302783 | 12/1988 |
| JP | H11-103593 A | 4/1999 |
| JP | 2002-345278 A | 11/2002 |
| JP | 2003-219681 A | 7/2003 |
| JP | 2005-242893 A | 9/2005 |
| JP | 2006-183391 A | 7/2006 |
| JP | 2007-062507 A | 3/2007 |
| JP | 2008-099467 A | 4/2008 |

OTHER PUBLICATIONS

Official Action issued by the Japanese Patent Office on Jan. 7, 2014 in Japanese Application No. 2009-192576, and an English language translation of Official Action (6 pgs).

\* cited by examiner

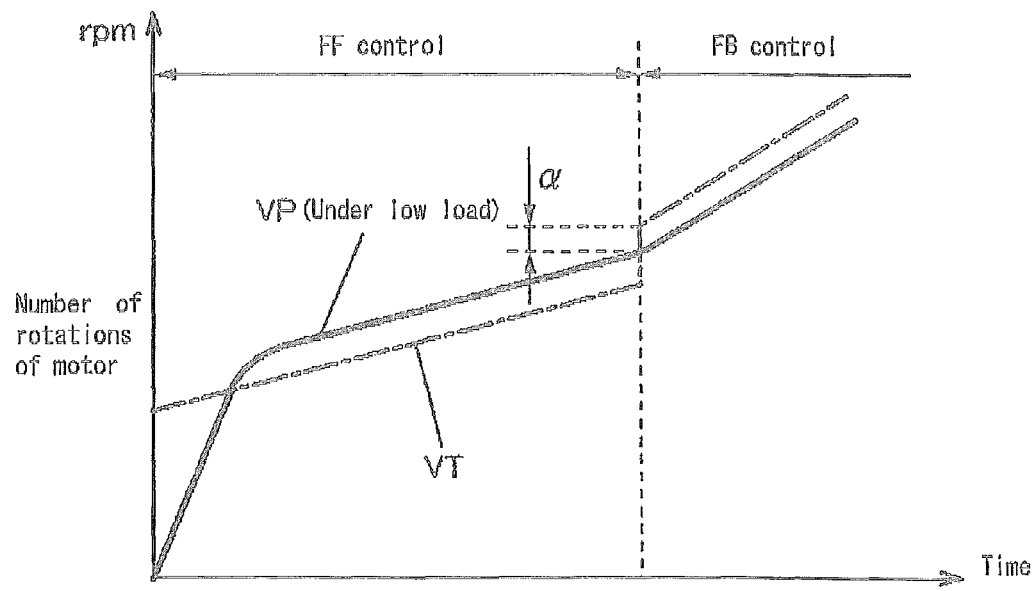
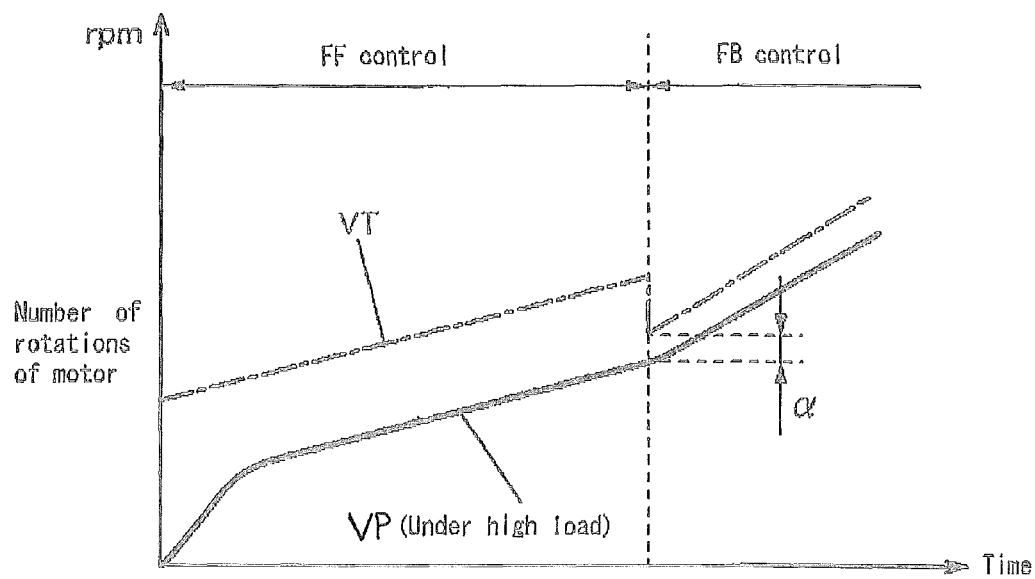

MOTOR CONTROL DEVICE AND SEAT CONTROL DEVICE FOR VEHICLE

CROSS REFERENCE TO RELATED APPLICATIONS

This application is based on and claims priority under 35 U.S.C. §119 to Japanese Patent Application 2009-192576, filed on Aug. 21, 2009, the entire content of which is incorporated herein by reference.

TECHNICAL FIELD

This disclosure generally relates to a motor control device for controlling a motor, which changes a position of a driven object.

BACKGROUND

There exists a mechanism for driving plural and individual components so as to move as a unit by means of plural motors. For example, there exists a vehicle seat, whose state is electrically switchable by using a motor between a seating state for allowing a user to sit thereon and a stored state by which a space within the vehicle is enlarged. Disclosed in JP2007-62507A is an example of an electric seat apparatus. The seat apparatus disclosed in JP2007-62507A is configured so that a state of the seat apparatus is switchable between a seating state and a stored state in response to an operation of an operation switch by a user. More specifically, a seat cushion and a seat back are driven by means of respective motors while the user continuously operates the operation switch, so that the state of the seat apparatus is switched between the seating state and the stored state. In this case, a moving speed of at least one of the seat cushion and the seat back is changed from a corresponding initial moving speed in a process of changing the state of the seat apparatus between the seating state and the stored state. Accordingly, an interference between the seat cushion and the seat back may be avoided and further, a total operation time may be shortened because a moving time of the seat cushion and a moving time of the seat back overlap. According to the above-mentioned mechanism, the motors need to be accurately controlled in conjunction with each other.

In a case where a mechanical end-point is set within a movable range of a movable portion such as the vehicle seat, an impact noise may be generated when the movable portion is mechanically stopped at the end-point or an uncomfortable vibration may be generated if the movable portion reaches the end-point while the motor is rotated steadily. Therefore, a slow down control for gradually decreasing a number of rotations of the motor (a rotational speed of the motor) needs to be executed when the movable portion is moved to the vicinity of the end-point, so that the displacement of the movable portion is slowly stopped. Similarly, in a case where the motor is operated at a steady number of rotations immediately after being actuated, the movable portion may suddenly move or an excessive load may be applied to the motor. Therefore, a slow start control for gradually increasing the number of rotations of the motor needs to be executed in order to start moving the movable portion slowly. However, a total operation time from a start of the operation to an end of the operation is preferably shortened as much as possible even if the movable portion is started to move slowly and is stopped slowly.

Furthermore, a posture of the vehicle seat is not limited to two simple states, i.e. the seating state and the stored state. For example, a reclining angle of the seat back may be adjusted by an occupant while the vehicle seat is in the seating state. In other words, the posture of the vehicle seat when being moved is not fixed to one posture. Therefore, in a case where a control is executed on the basis of a target number of rotations of the motor, which is determined in response to a position of the seat in order to start and stop the movable portion slowly by means of the motor, without considering a position and the posture of the vehicle seat when being started to move, the vehicle seat (plural movable portions) may not be moved in unity and the user may feel discomfort. Hence, a series of operations from the start of the operation to the end of the operation, are preferably executed so as to achieve a unified movement of the vehicle seat without being influenced by the operation starting position of the vehicle.

Furthermore, in the case where the vehicle seat is operated so as to slowly start moving, the number of rotations of the motor is low, specifically at an early stage of the operation. For example, in a case where a system for calculating an actual number of rotations of the motor on the basis of a pulse signal outputted from a hall sensor is adapted, a resolution of the actual number of rotations of the motor may become low while the number of the rotations of the motor is low. As a result, an update of the actual number of rotations of the motor may be delayed. Accordingly, a feedback control based on a deviation between the target number of rotations and the actual number of rotations of the motor may not effectively function. On the other hand, in a case where a simple feed-forward control is executed, a great difference between the actual number of rotations and the target number of rotations of the motor may occur because a slide resistance differs depending on a mechanical annual change of the motor, the vehicle seat and the like and on an ambient temperature. As a result, the motor may unexpectedly be stopped because of a shortage of a torque. Hence, the motor is preferably controlled by using a control method having a high tolerance against an operation environment such as the mechanical annual change, the ambient temperature, a power voltage fluctuation and the like.

As described above, specifically in the case where the mechanism is driven by operation of the plural motors in conjunction with each other, each motor needs to be accurately controlled. Therefore, a motor control that overcomes the above-mentioned various drawbacks needs to be provided. Even if a mechanism is actuated only by one motor, instead of plural motors in conjunction with each other, the control that overcomes the above-mentioned various drawbacks is of benefit.

A need thus exists to provide a motor control device which is not susceptible to the drawback mentioned above.

SUMMARY

According to an aspect of this disclosure, a motor control device includes an acceleration portion for increasing a target number of rotations of a motor every predetermined calculation cycle until the target number of rotations of the motor reaches an upper limit number of rotations, which is set on the basis of a reached position of a driven object from a reference position, the driven object being driven by the motor so that a position of the driven object is changed, a deceleration portion for decreasing the target number of rotations of the motor every calculation cycle after the target number of rotations reaches the upper limit number of rotations, and a main control portion for controlling a drive of the motor on the basis of the target number of rotations.

According to another aspect of this disclosure, a motor control device includes an acceleration portion for increasing a target number of rotations of a motor every predetermined calculation cycle until the target number of rotations of the motor reaches an upper limit number of rotations, which is set on the basis of a reached position of a driven object from a reference position, the driven object is driven by the motor so that a position of the driven object is changed, a deceleration portion for decreasing the target number of rotations of the motor every calculation cycle after the target number of rotations reaches the upper limit number of rotations, and a main control portion for driving and controlling the motor on the basis of the target number of rotations, wherein the upper limit number of rotations is set as a value, which decreases as a displacement amount of the driven object from the reference position increases and includes a final steady number of rotations as a minimum value, by which the motor is rotated in a constant speed, and the deceleration portion decreases the target number of rotations on the basis of the upper limit number of rotations.

BRIEF DESCRIPTION OF THE DRAWINGS

The foregoing and additional features and characteristics of this disclosure will become more apparent from the following detailed description considered with the reference to the accompanying drawings, wherein:

FIG. 9 is a diagram illustrating an example case where a target number of rotations is adjusted when the control is switched (i.e. when the motor is driven under a low load applied thereto);

FIG. 10 is a diagram illustrating an example case where the number of rotations is adjusted when the control is switched (i.e. when the motor is driven under a high load applied thereto);

DETAILED DESCRIPTION

Figure 1:
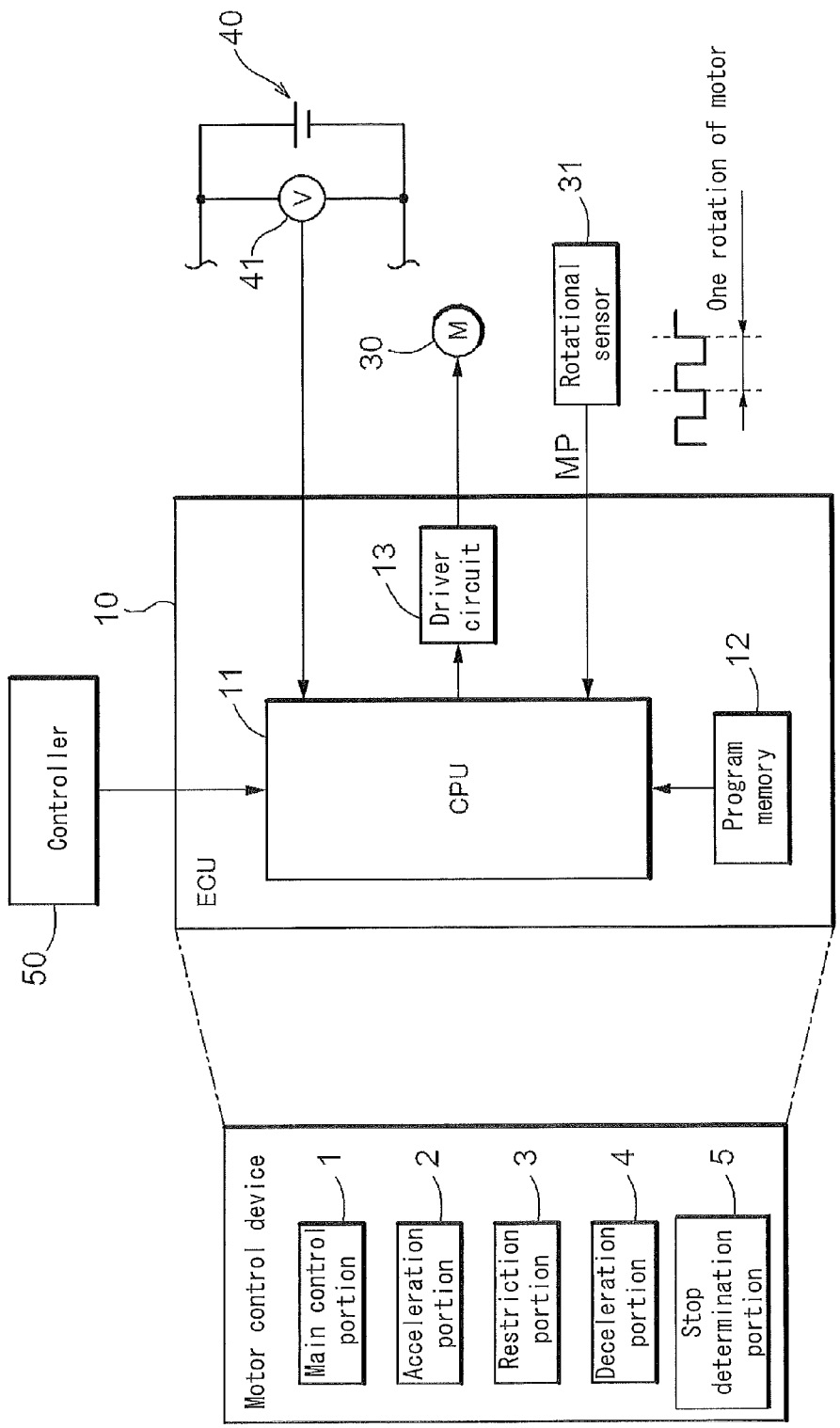
FIG. 1 is a block diagram schematically illustrating a configuration example of a motor control device according to an embodiment.

An embodiment of a motor control device will be described below with reference to the attached drawings. The motor control device according to the embodiment controls a motor 30 on the basis of a position of a driven object, which is driven by the motor 30 and whose position is changeable in response to an actuation of the motor 30. The driven object includes, for example, an automatic door of a building, an electric seat, a slide door, a power window and the like of a vehicle. As illustrated in FIG. 1, the motor control device is configured as an electronic control unit 10 (which will be hereinafter referred to as an ECU 10), which is configured mainly with a central processing unit 11 (which will be hereinafter referred to as a CPU 11) as a core. The ECU 10 includes a program memory 12, a driver circuit 13 and the like. The program memory stores therein a program serving as a software run by the CPU 11. The driver circuit 13 converts an output of the CPU 11, which is configured as a circuit operating various functions generally by a low voltage, into a motor drive voltage higher than a power voltage of the CPU 11 in order to drive the motor 30 on the basis of the obtained motor drive voltage. The motor control device includes various functional portions indicated by reference numerals 1 to 5 in FIG. 1. Each of the functional portions is achieved by a hardware, such as the CPU 11 and the driver circuit 13, and the software stored within the program memory 12 in conjunction with each other. The above-mentioned configuration is one example and the ECU 10 may be modified so as to include a digital signal processor (DSP), other logic processor, a logic circuit and the like.

The motor 30 includes a rotational sensor 31 for detecting a rotation of the motor 30. The rotational sensor 31 may be imbedded in the motor 30. The rotational sensor 31 is configured so as to include, for example, a hall IC and the like. An inexpensive sensor, which has a low resolution capacity and outputs one cycle of a pulse signal MP for every rotation of the motor 30, is adapted as the rotational sensor 31. A motor having a higher resolution capacity may be adapted as the rotational sensor 31. However, according to the embodiment, the motor control device is configured so as to appropriately and properly execute a control by using the rotational sensor 31 having the low resolution capacity. The ECU 10 is configured so as to detect the position of the driven object, which is driven by the motor 30 and whose position is changed in response to the operation of the motor 30, on the basis of a number of pulses included in the pulse signal MP. Accordingly, the rotational sensor 31 also functions as a positional sensor for detecting the position of the driven object, in addition to detecting a number of rotations, a rotational speed and the like of the motor 30.

In a case where the motor 30 is driven in response to a supply of an electric power from a battery 40 to the motor 30, e.g. in a case where the motor 30 is adapted as a motor mounted on the vehicle, a voltage of the supplied electric power may fluctuate. Therefore, a detection result of a voltmeter 41 (a voltage sensor) for measuring a power voltage of the battery 40 is inputted into the ECU 10. Then, the ECU 10 drives and controls the motor 30 in view of the power voltage supplied to the motor 30.

Figure 2A:
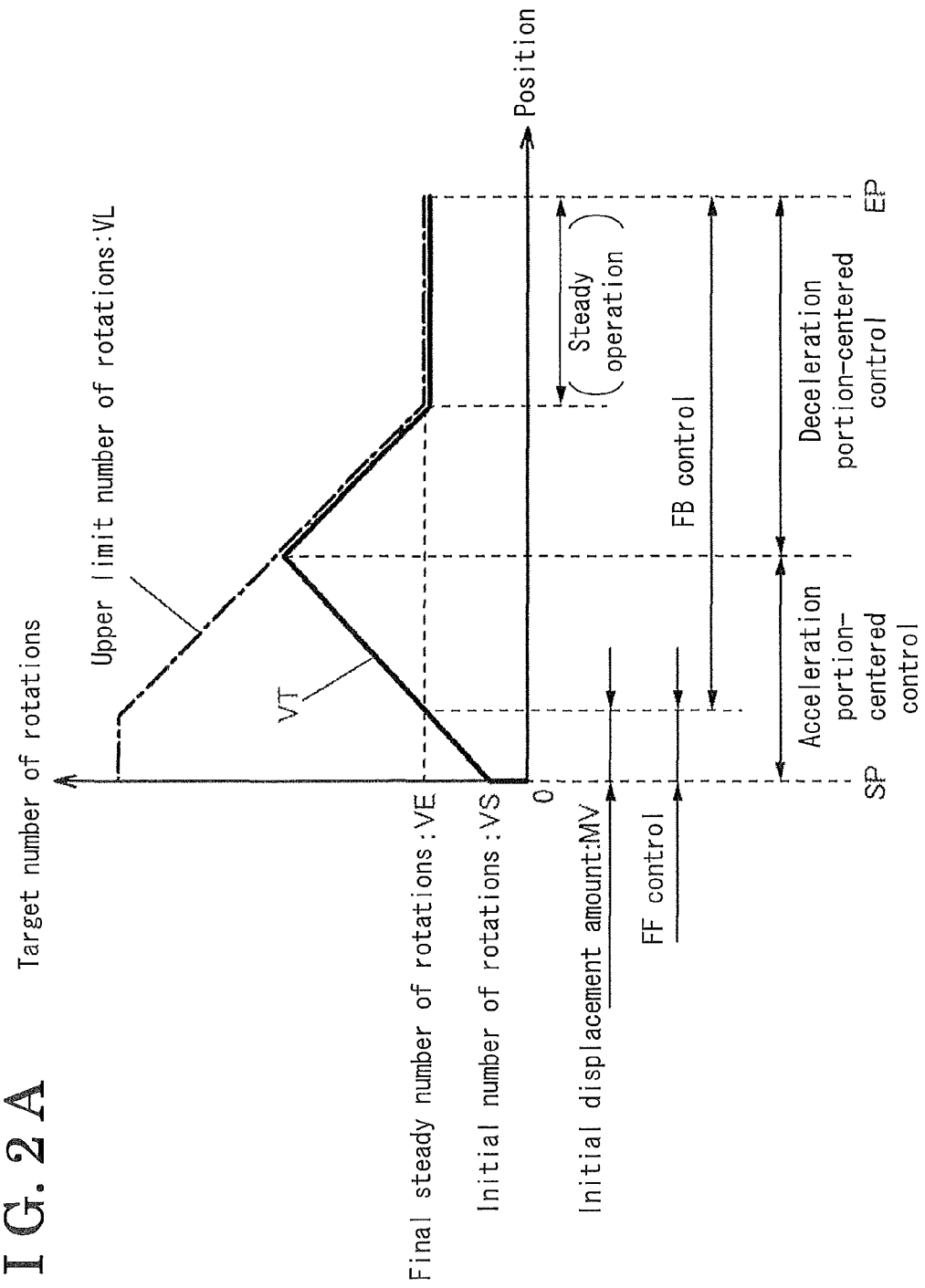
FIG. 2A and FIG. 2B are diagrams illustrating a control overview on the basis of a relationship between a position of a driven object and a target number of rotations of a motor.
Figure 2B:
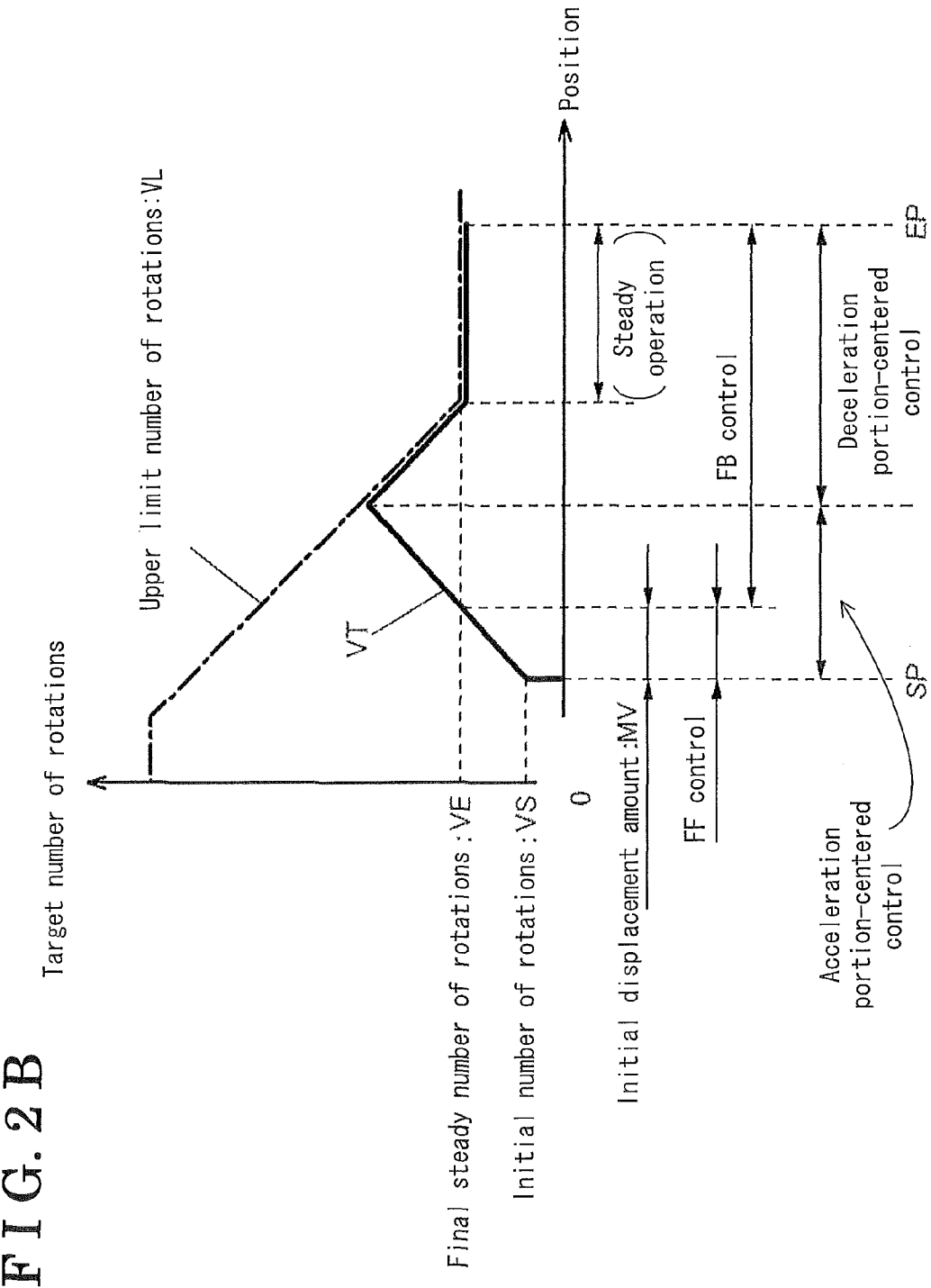
Figure 12:
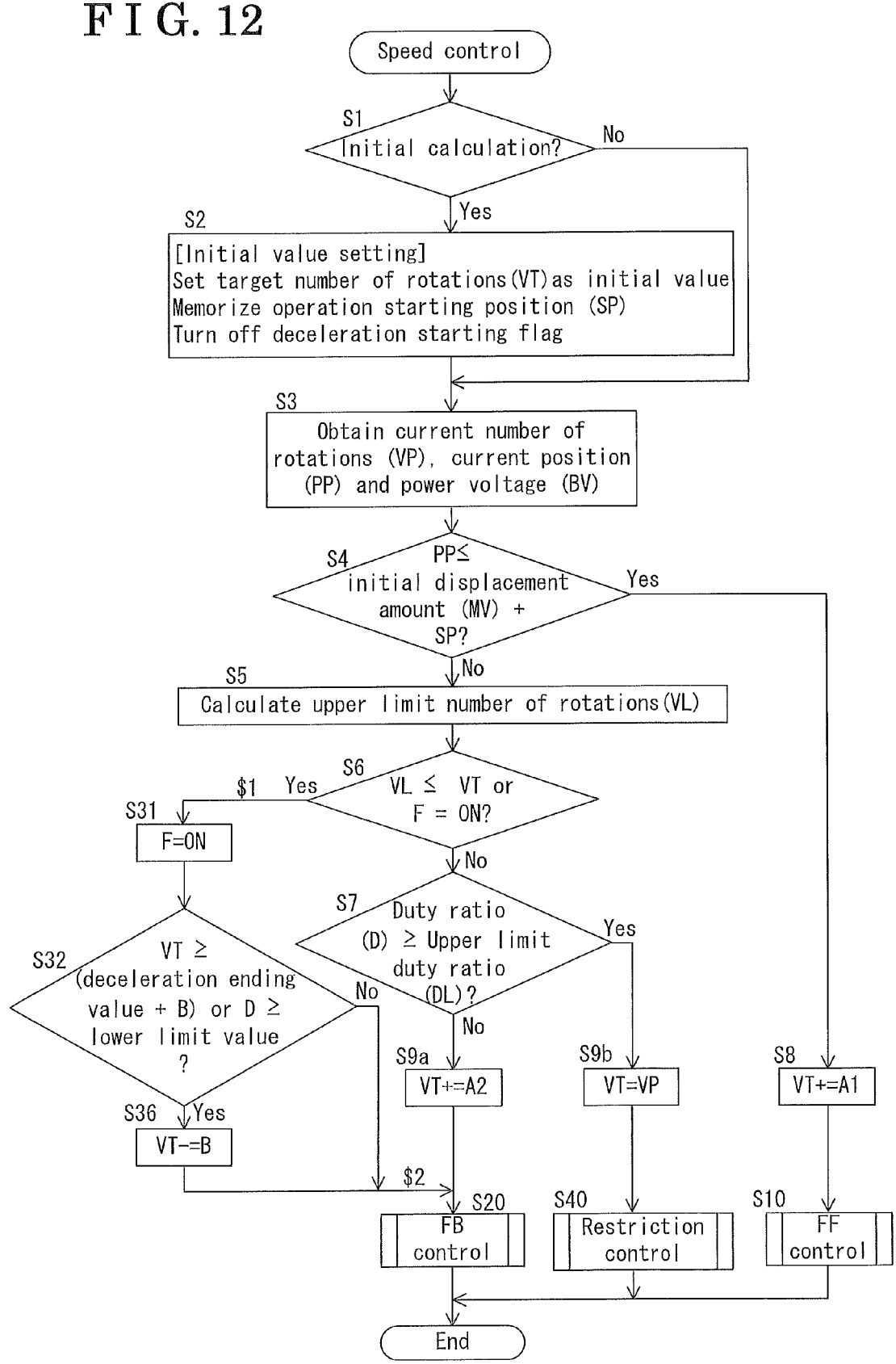
FIG. 12 is a flowchart illustrating an entire motor speed control.

As illustrated in FIG. 1, the ECU 10 (the motor control device) includes plural functional portions such as a main control portion 1, an acceleration portion 2, a restriction portion 3, a deceleration portion 4 and a stop determination portion 5. Functions and operations of each functional portion will be described below with reference also to FIGS. 2A and 2B illustrating a brief overview of a control of the motor 30 executed by the motor control device on the basis of a relationship between the position of the driven object and a target number of rotations VT of the motor 30. The main control portion 1 is a functional portion for driving and controlling the motor 30 on the basis of the target number of rotations VT. More specifically, the main control portion 1 controls a drive of the motor 30 by executing a pulse width modulation (PWM) in this embodiment. The acceleration portion 2 is a functional portion for increasing the target number of rotations of the motor 30 when being started (i.e. an initial number of rotations VS) at every predetermined calculation cycle until the target number of rotations VT of the motor 30 reaches an upper limit number of rotations VL thereof, which is set in response to the position of (a reached position of) the driven object from a reference position (zero (0)). The deceleration portion 4 is a functional portion for decreasing the target number of rotations VT of the motor 3 at every calculation cycle until the target number of rotations of the motor 30 reaches a final steady number of rotations VE, by which the motor 30 is driven at a constant speed, after the target number of rotations VT reaches the upper limit number of rotations VL. In this embodiment, the calculation cycle indicates a calculation cycle of the CPU 11. For example, the calculation cycle corresponds to a period of time while a series of processes indicated in FIG. 12 are being executed. In a case where a drive command to the driven object is outputted from a controller 50, which controls the ECU 10, when the calculation cycle starts, the series of processes indicated in FIG. 12 are executed.

Illustrated in FIG. 2A is an example case where the driven object starts moving from a position of zero (0), which corresponds to the reference position of the driven object. Illustrated in FIG. 2B is an example case where the driven object starts moving from a position other than the reference position. As is evident from FIGS. 2A and 2B, changes in the target number of rotations VT of the motor 30 are similar between the case where the driven object starts moving from the reference position and the case where the driven object starts moving from the position other than the reference position. In other words, the changes in the target number of rotations VT of the motor 30 is not influenced by a displacement starting position SP of the driven object. Therefore, the driven object visually moves in the constant manner from the start of the displacement to the end of the displacement without being influenced by the displacement starting position SP of the driven object. Accordingly, the user may not feel discomfort, because the driven object is moved in unity when being operated.

In order to achieve the changes in the target number of rotations VT in the constant manner so that the driven object is moved in unity, the upper limit number of rotations VL may preferably be set so that a minimum value thereof is set as the final steady number of rotations VE and so that a value of the upper limit number of rotations VL decreases as a displacement amount of the driven object from the reference position becomes great. In this case, the target number of rotations VT is reduced down to the final steady number of rotations VE by means of the deceleration portion 4 after the target number of rotations VT reaches the upper limit number of rotations VL. In other words, the deceleration portion 4 reduces the target number of rotations VT as the displacement amount of the driven object from the reference position becomes great.

A relationship between the target number of rotations VT of the motor 30 and the changes in the position of the driven object will be described in detail below with reference to FIGS. 2A and 2B. The initial number of rotations VS is set as the target number of rotations VT when the driven object is positioned at the displacement starting position SP. The initial number of rotations VS is set to have a number of rotations by which the motor 30 smoothly starts rotating. Then, an acceleration portion 2-centered control is executed and the target number of rotations VT is gradually increased. In other words, a so-called slow start of the motor 30, where the number of rotations of the motor 30 is gradually and slowly increased from the initial number of rotations VS by which the motor 30 is driven at a slow speed, is performed. As will be described later, when the motor 30 starts rotating, the main control portion 1 executes a feedforward control (FF control) in order to control the drive of the motor 30. Then, the main control portion 1 switches the control to a feedback control (FB control) from the feedforward control after the driven object is displaced by a constant initial displacement amount MV while a slow start control is being executed.

When the target number of rotations VT reaches the upper limit number of rotations VT while the motor 30 is started so as to gradually increase the number of rotations thereof, the target number of rotations VT is gradually decreased by the control executed mainly by the deceleration portion 4. In other words, the motor 30 is gradually slowed down from the upper limit number of rotations VL by which the motor 30 is rotated at a high speed. When the target number of rotations VT is decreased and reaches the final steady number of rotations VE, the target number of rotations VT is maintained at the final steady number of rotations VE. In other words, the motor 30 is steadily rotated (a steady operation of the motor 30 is performed) after the target number of rotations VT reaches the final steady number of rotations VE. However, the steady operation of the motor 30 may be considered as a deceleration operation where a deceleration ratio is zero (0). In this case, the steady operation of the motor 30 may be considered to be included in the control mainly executed by the deceleration portion 4. The final steady number of rotations VE is set so that the rotational speed of the motor 30 driven on the basis of the final steady number of rotations VE is sufficiently low. The driven object is continuously moved up to the mechanical end point (a displacement completing position EP) while maintaining a speed achieved by the final steady number of rotations VE (low speed). For example, in a case where en elastic member such as a rubber and the like is provided at the end point, the driven object, which reaches the end point at the sufficiently low speed, may complete the displacement without generating an impact. In this case, the driven object may be slowly stopped by the slow down control and the steady operation executed mainly by the deceleration portion 4. The deceleration portion 4-centered control is executed following the acceleration portion 2-centered control. In other word, the deceleration portion 4-centered control is executed after the control is switched to the feedback control from the feedforward control. Therefore, the motor 30 is driven and controlled by the feedback control while the deceleration portion 4-centered control is being executed.

Figure 3:
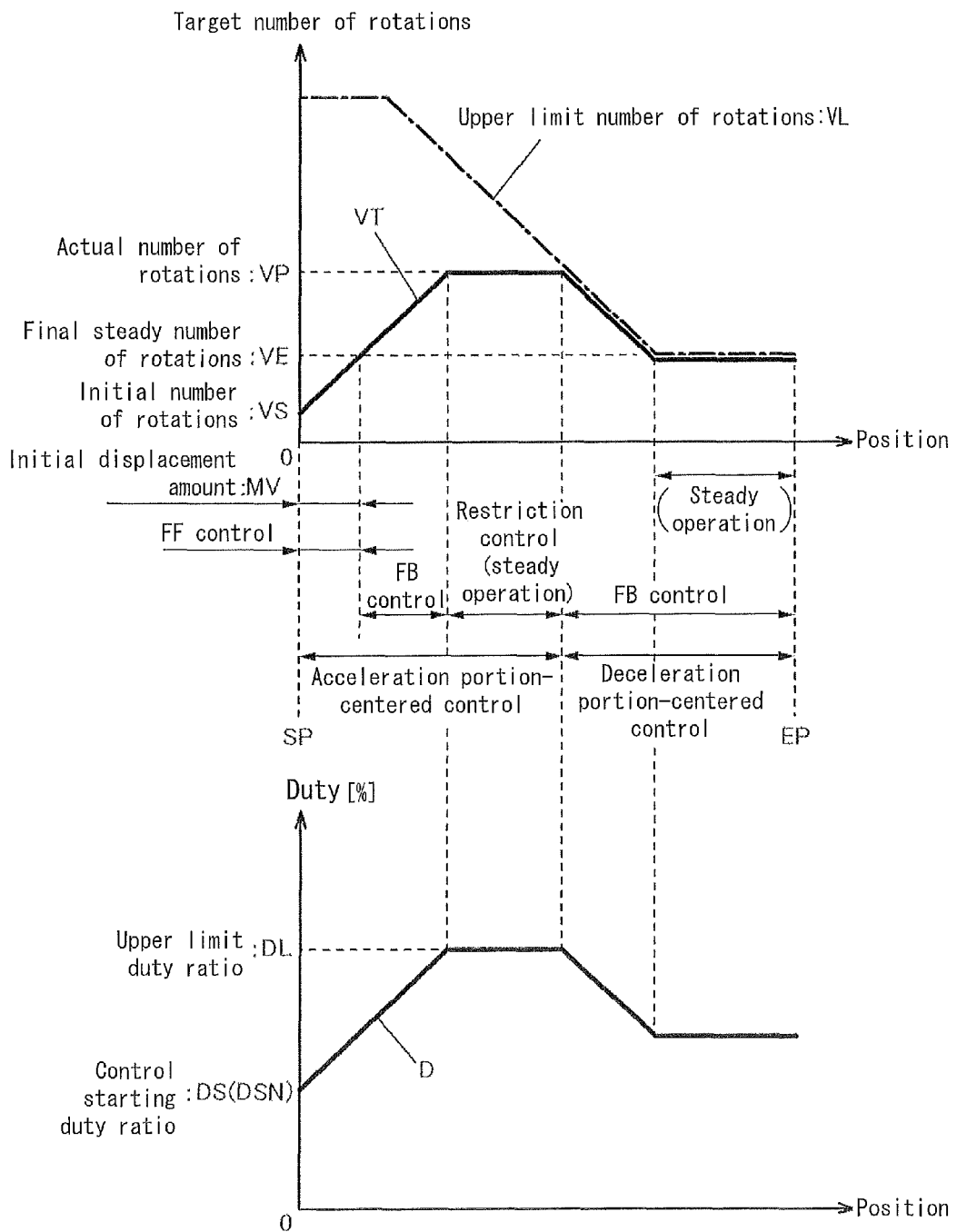
FIG. 3 is a diagram illustrating a concept of a duty control executed by a restriction portion.

The restriction portion 3 is a functional portion that restricts (limits) the number of rotations of the motor 30 in response to an output, which is allowed for the motor 30 to generate (i.e. an allowable output of the motor 30). More specifically, as illustrated in FIG. 3, the restriction portion 3 restricts an increase of the target number of rotations VT executed by the acceleration portion 2 in the case where the output of the motor 30 reaches the allowable output. Then, the restriction portion 3 maintains the target number of rotations VT at an actual number of rotations VP of the motor 30 until the target number of rotations VT reaches the upper limit number of rotations VL. Even if the increase of the target number of rotations VT is restricted by the restriction portion 3, the motor 30 keeps rotating, therefore, the driven object also keeps moving. As described above, the upper limit number of rotations VL is set as the value, which decreases as the displacement amount of the driven object becomes great. Hence, even if the target number of rotations VT is fixed at the actual number of rotations VP, the target number of the rotations VT eventually reaches the upper limit number of rotations VL when the displacement amount of the driven object becomes great. When practicing, the value of the upper limit number of rotations VL, which decreases, reaches the target number of rotations VT, which is fixed at the actual number of rotations by the restriction portion 3.

Figure 4:
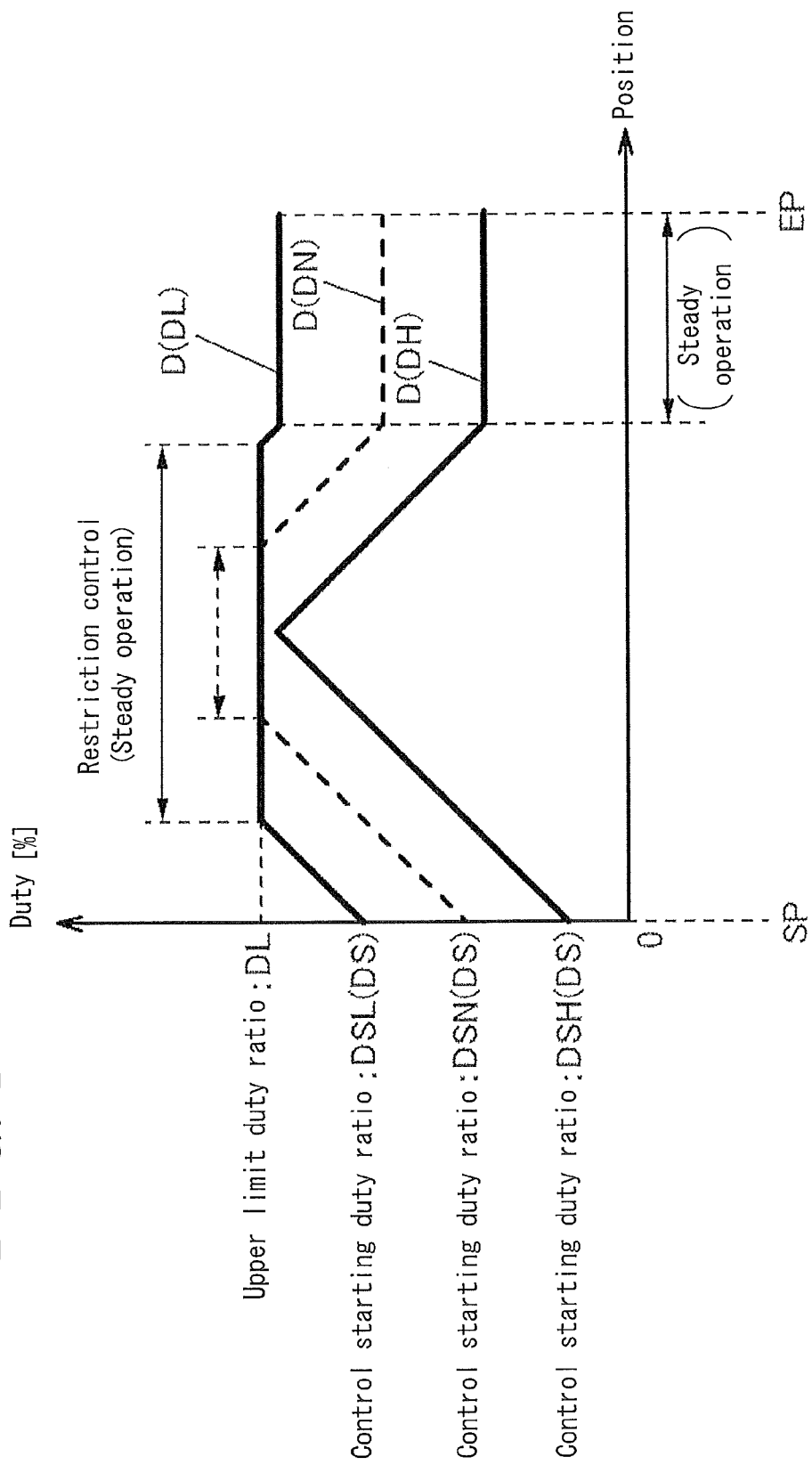
FIG. 4 is a diagram illustrating a relationship between a power voltage and the duty control.

The output allowed for the motor 30 to generate may be set (controlled) on the basis of a duty ratio D of the pulse width modulation. As illustrated in FIG. 3, in this embodiment, the restriction portion 3 determines that the output of the motor 30 reaches the allowable output of the motor 30 when the duty ratio D of the pulse width modulation executed by the main control portion 1 reaches a predetermined upper limit duty ratio DL. The upper limit duty ratio DL is set to, for example, 90 percent. The duty ratio when the control of the motor 30 is started (i.e. a control starting duty ratio DS) may be calculated on the basis of the power voltage (BV) of the motor 30, e.g. the voltage of the battery 40. An example of a duty control illustrated in FIG. 3 is achieved, for example, in a case where the power voltage BV of the motor 30 is set as a reference voltage (e.g. 12V). A case where the power voltage BV of the motor 30 is higher than the reference voltage (e.g. a case where the power voltage BV of the motor 30 is 14V) and a case where the power voltage BV of the motor 30 is lower than the reference voltage (e.g. a case where the power voltage BV of the motor 30 is 10V) are illustrated in FIG. 4 with reference to the reference voltage. A broken line DN in FIG. 4 indicates the duty ratio D in the case where the power voltage BV corresponds to the reference voltage. A range where the restriction control is executed by the restriction portion 3 is indicated by dashed arrows.

A solid line DH in FIG. 4 indicates the duty ratio D in the case where the power voltage BV is high. In the case where the power voltage BV is high, the motor 30 may be driven even if the duty ratio D (DH) is low. Therefore, the control starting duty ratio DS (DSH) in this case is set as a small value. Accordingly, because the control starting duty ratio DSH is set as the small value, the duty ratio has a sufficient amplitude up to the upper limit duty ratio DL. In the example illustrated in FIG. 4, the duty ratio D (DH) does not reach the upper limit duty ratio DL even if the number of rotations of the motor 30 is increased to the upper limit number of rotations VL. Accordingly, the restriction control by the restriction portion 3 is not executed.

A solid line DL in FIG. 4 indicates the duty ratio D in the case where the power voltage BV is low. In the case where the power voltage BV is low, the duty ratio D (DL) needs to be increased in order to drive the motor 30. Therefore, the control starting duty ratio DS (DSL) in this case is set as a great value. Accordingly, because the control starting duty ratio DSL is set as the great value, the duty ratio D does not have a sufficient amplitude up to the upper limit duty ratio DL. In the example illustrated in FIG. 4, the duty ratio D reaches the upper limit duty ratio DL before the number of rotations of the motor 30 is increased to reach the upper limit number of rotations VL. The duty ratio D (DL) reaches the upper limit duty ratio DL faster in the case where the displacement amount of the driven object is small when comparing to the case where the motor 30 is driven by the reference voltage.

Figure 5:
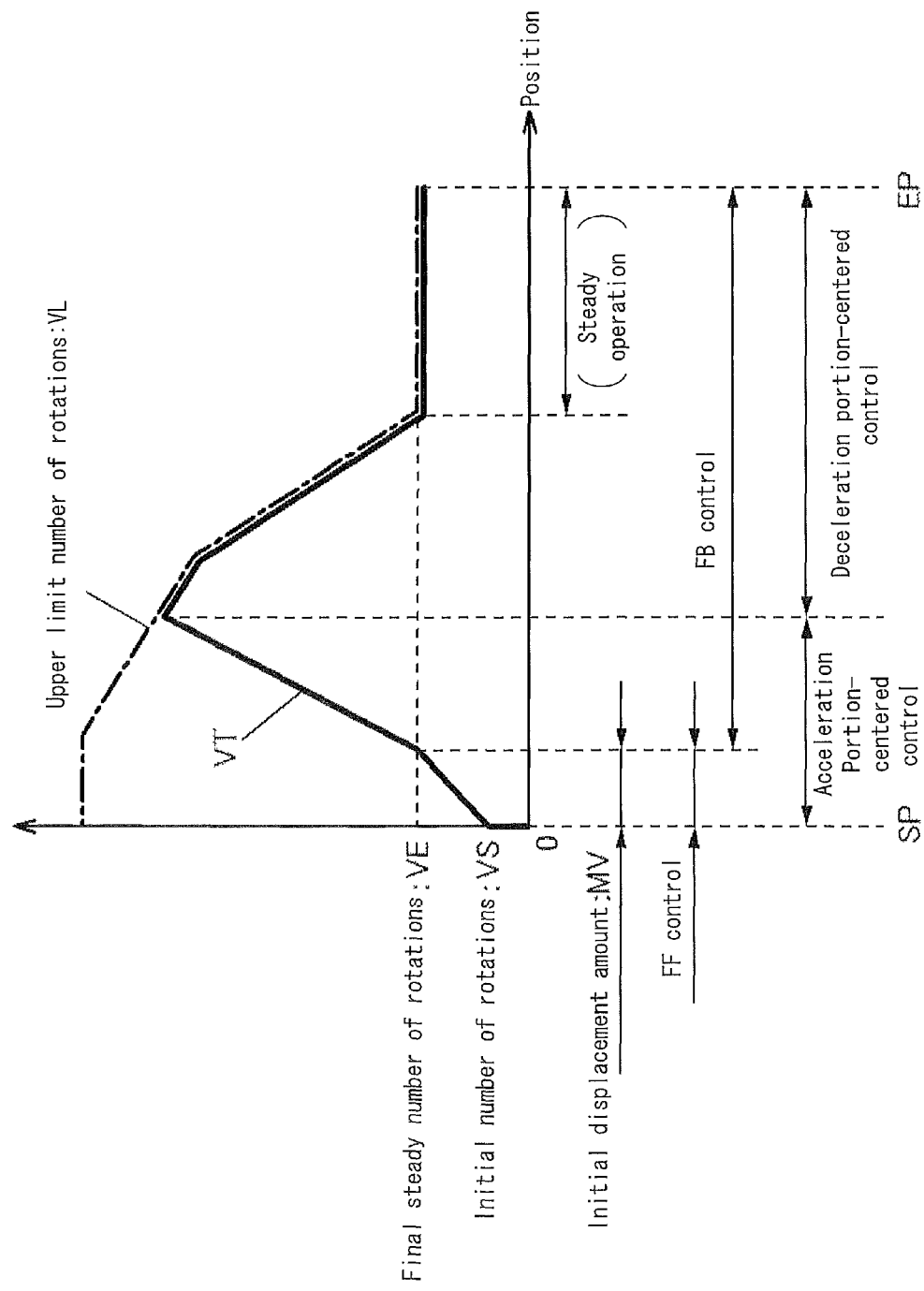
FIG. 5 is a diagram illustrating an example of a control executed in a case where an increase and a decrease of the target number of rotations are controlled in plural stages.

In the example illustrated in FIGS. 2 to 4, an increase in speed executed by the acceleration portion 2 and a deceleration in speed executed by the deceleration portion 4 are executed in a constant manner (i.e. the rotational speed of the motor 30 is accelerated and decelerated by the same (constant) ratio). However, the motor control device is not limited to the above-described configuration. For example, the acceleration portion 2 may be configured so as to increase the target number of rotations VT by an increasing ratio, which is set to increase as the displacement amount of the driven object from the reference position increases. In this case, because the target number of rotations VT quickly increases, a duration of time for completing the displacement of the driven object may be shortened. As described above, the control is switched from the feedforward control to the feedback control while the acceleration portion 2-centered control is being executed. As illustrated in FIG. 5, the acceleration portion 2 may be configured so as to increase the target number of rotations VT by different increasing rates between when the main control portion 1 executes the feedforward control and when the main control portion 1 executes the feedback control. Similarly, as illustrated in FIG. 5, the upper limit number of rotations VL may be set so as to decrease by a decelerating ratio, which is set so as to increase as the displacement amount of the driven object from the reference position increases. In this case, because the target number of rotations VT quickly decreases as approximating to the final steady number of rotations VE, the displacement of the driven object rapidly decreases and the user may feel a deceleration in the moving speed of the driven object.

Figure 6:
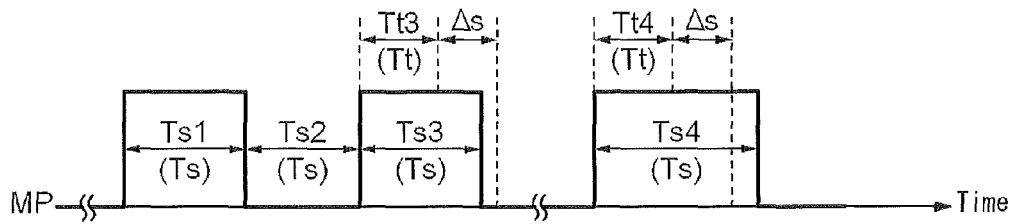
FIG. 6 is a diagram illustrating a condition for determining a low speed rotation of the motor on the basis of a waveform generated by a rotational sensor.

As described above, the main control portion 1 executes the feedforward control in order to drive and control the motor 30 when the motor 30 starts rotating. The target number of rotations VT is increased by the predetermined increasing ratio in the feedforward control. Therefore, the actual number of rotations VP of the motor 30 is not directly reflected in the target number of rotations VT. Therefore, the target number of rotations VT and the actual number of rotations VP may differ from each other depending on a mechanical wear of the driven object, an environmental condition such as temperature and humidity, and the like. The difference between the target number of rotations VT and the actual number of rotations VP may be detected on the basis of an elapsed time from an update of the pulse (a pulse update) of the pulse signal MP of the rotational sensor 31. The pulse is updated when a logic of the pulse signal MP is reversed. The elapsed time from the pulse updates indicates a time Ts (Ts1 to Ts4) (a duration of time) since the logic of the pulse signal MP is reversed (see FIG. 6).

Figure 7:
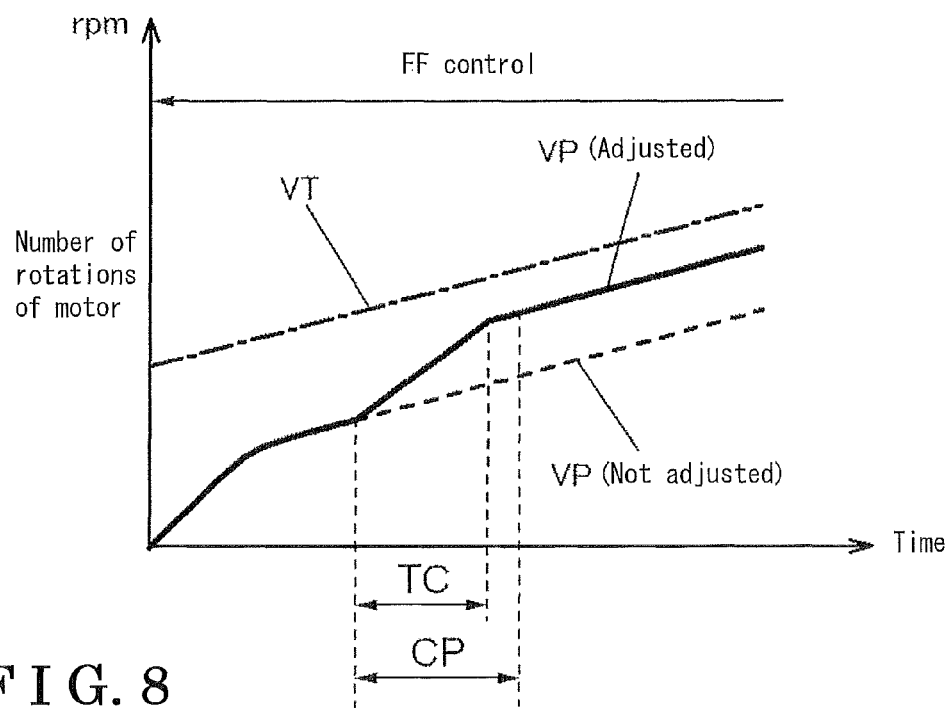
FIG. 7 is a diagram illustrating an example case where a duty ratio is adjusted when the motor is determined to be rotated at a low speed.

The ECU 10 (the main control portion 1) checks the elapsed time Ts every calculation cycle. The main control portion 1 determines that the target number of rotations deviates from the actual number of rotations VP when the elapsed time Ts exceeds a value, which is obtained by adding an allowance value Δs to a predetermined pulse interval Tt. The predetermined pulse interval Tt corresponds to a pulse interval generated when the motor 30 is rotated in accordance with the target number of rotations VT. Accordingly, the main control portion 1 determines that a relatively great difference occurs between a cycle based on the target number of rotations VT and a cycle based on the actual number of rotations VP when, as indicated by an elapsed time Ts4 in FIG. 6, the elapsed time Ts4 exceeds the sum of a pulse interval Tt4 (Tt) and the allowance value Δs. In other words, in this case, the main control portion 1 determines that the cycle based on the target number of rotations VT and the cycle based on the actual number of rotations VP deviate from each other in a case where the difference between the rotational number of rotations VT and the actual number of rotations VP is equal to or greater than the predetermined allowance value. Then, the main control portion 1 executes an adjustment process for increasing the duty ratio D of the pulse width modulation on the basis of the determination result. As a result, the actual number of rotations VP approximates to the target number of rotations VT, as illustrated in FIG. 7. In this embodiment, the main control portion 1 increases the duty ratio D of the pulse width modulation by a predetermined amount (Δd) every calculation cycle during an adjustment period TC. The adjustment period TC is set to be shorter than a period of time CP, which is indicated in FIG. 7. The predetermined amount Δd added to the duty ratio D is set as an increasing amount by which the duty ratio D reaches 100 percent in the adjustment period TC.

The period of time CP, which is indicated in FIG. 7, is set on the basis of a relationship with the stop determination portion 5. The stop determination portion 5 determines whether or not the motor 30 is in a stopped state on the basis of the actual number of rotations VP of the motor 3. As described above, the elapsed time Ts from the pulse update becomes longer as the actual number of rotations VP of the motor 30 decreases. For example, when the displacement of the driven object is interrupted, the rotation of the motor 30, which is mechanically connected to the driven object, is also interrupted. Therefore, the actual number of rotations VP of the motor 30 decreases. Then, when the displacement of the driven object is blocked so as not to move therebeyond, the rotation of the motor 30 is also stopped. In this case, the pulse signal MP is not updated and the elapsed time Ts from the pulse update continues. When the elapsed time Ts exceeds a predetermined threshold value, the stop determination portion 5 determines that the motor 30 is in the stopped state. The period of time CP indicated in FIG. 7 corresponds to the threshold value. Furthermore, the period of time CP indicated in FIG. 7 is a period of time set for determining the stopped state of the motor 30 by the stop determination portion 5.

The increasing amount Δd added to the duty ratio D of the pulse width modulation is preferably set as an increasing amount by which the duty ratio D reaches 100 percent during a period of time from when the main control portion 1 determines that the actual number of rotations VP is lower than the predetermined value relative to the target number of rotations VT to when the stop determination portion 5 determines that the motor 30 is in the stopped state. More specifically, the predetermined value Δd may be set as the increasing amount by which the duty ratio D reaches 100 percent from the control starting duty ratio DSH to be set when the motor 30 is driven by the high voltage during the period of time CP, in view of the increase of the duty ratio D immediately after the start of the displacement of the driven object. Additionally, the interruption in the displacement of the driven object includes a case where, for example, a grease applied at a movable portion of a vehicle seat, which is adapted as the driven object, hardens under a low-temperature environment and a slide resistance increases.

Furthermore, as described above, the main control portion 1 continuously executes the feedforward control until the driven object is displaced by the predetermined initial displacement amount MV since the driven object is started to move (from the displacement starting position SP). Then, after the driven object is displaced so as to exceed the initial displacement amount MV, the main control portion 1 executes the feedback control. In the case where the difference between the target number of rotations VT and the actual number of rotations VP becomes equal to or greater than a predetermined allowable difference while the feedforward control is being executed, the main control portion 1 executes the adjustment for increasing the duty ratio D, as described above. However, the adjustment control executed by the main control portion 1 is not a feedback control for matching the actual number of rotations VP with the target number of rotations VT, but a control for increasing the duty ratio D only by the predetermined amount Δd every calculation cycle. Therefore, the difference between the target number of rotations VT and the actual number of rotations VP may still be relatively great at a point of time when the control is shifted from the feedforward control to the feedback control. Additionally, in a case where the actual number of rotations VP exceeds the target number of rotations VT, the displacement of the driven object is speeded up. Therefore, in this case, the difference between the actual number of rotations VP and the target number of rotations VT does not necessarily need to be reduced by the main control portion 1 executing the adjustment process to reduce the duty ratio D. Therefore, the actual number of rotations VP may greatly exceed the target number of rotations VT at the point of time when the control is shifted from the feedforward control to the feedback control.

Figure 8:
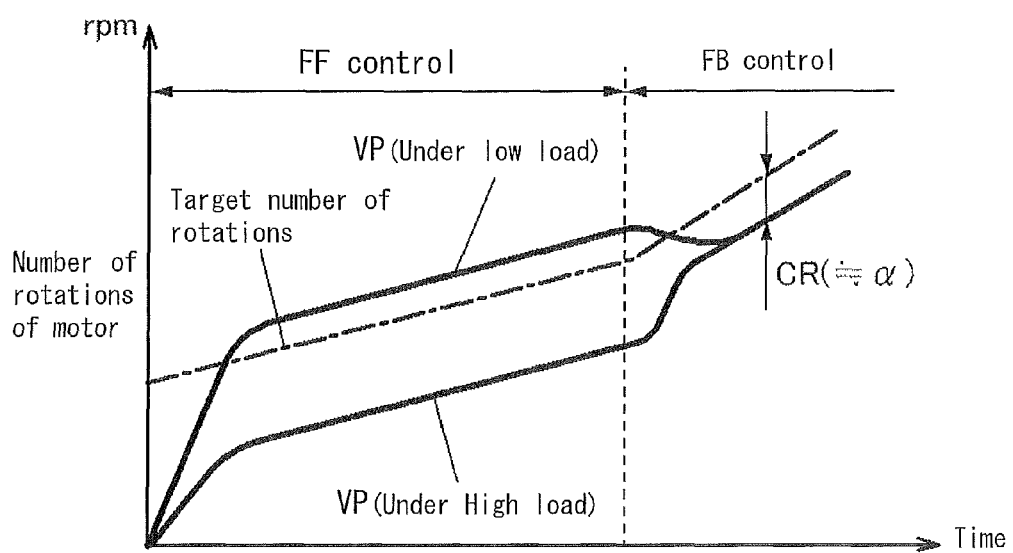
FIG. 8 is a diagram illustrating an example case where disturbance occurs in a number of rotations of the motor when a control is switched.

In the case where the difference between the actual number of rotations VP and the target number of rotations VT is great when the control is shifted from the feedforward control to the feedback control, a great shift as illustrated in FIG. 8 may occur at the actual number of rotations VP because the difference between the actual number of rotations VP and the target number of rotations VT is rapidly adjusted by the feedback control, which is started by the main control portion 1. For example, the actual number of rotations VP becomes greater than the target number of rotations VT in the case where the motor 30 is driven under the low load applied thereto. In this case, a shift where the actual number of rotations VP rapidly decreases may occur after the control is shifted to the feedback control. On the other hand, in the case where the motor 30 is driven under the high load applied thereto, the actual number of rotations VP becomes smaller than the target number of rotations VT. In this case, a shift where the actual number of rotations VP rapidly increases may occur after the control is shifted to the feedback control. The aforementioned shifts may generate a fluctuation in the movement of the driven object. As illustrated in FIG. 8, a predetermined control delay CR between the target number of rotations VT and the actual number of rotations VP, which follows the target number of rotations VT, may be included in the feedback control. In this embodiment, the control delay CR, which is lower than the target number of rotations VT, is considered as an example. Furthermore, a level of the control delay CR is exaggerated in this embodiment in order to facilitate understanding.

As illustrated in FIGS. 9 and 10, when the control is shifted from the feedforward control to the feedback control, the main control portion 1 updates the target number of rotations VT to a value, which is obtained by adding a predetermined offset value α to the actual number of rotations VP of the motor 30 generated when the control is shifted from the feedforward control to the feedback control. The offset value α may preferably be set on the basis of the control delay CR. Illustrated in FIG. 9 is the case where the motor 30 rotates under the low load applied thereto. On the other hand, illustrated in FIG. 10 is the case where the motor 30 rotates under the high load applied thereto. By adjusting the target number of rotations VT as described above, the control is smoothly shifted from the feedforward control to the feedback control.

Figure 11A:
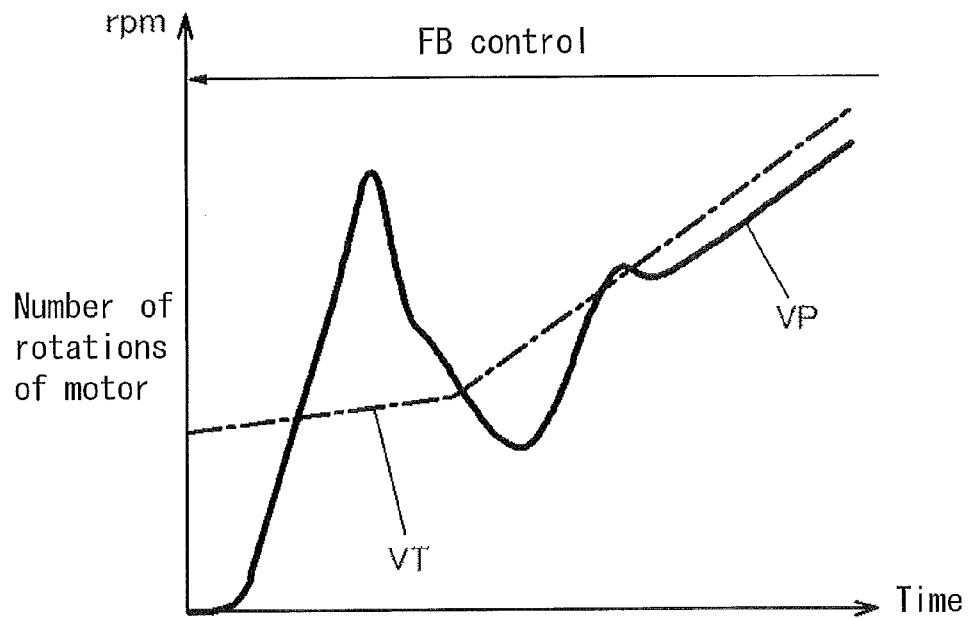
FIG. 11A and FIG. 11B are diagrams for explaining advantages and merits to be achieved in the case where the control is switched.
Figure 11B:
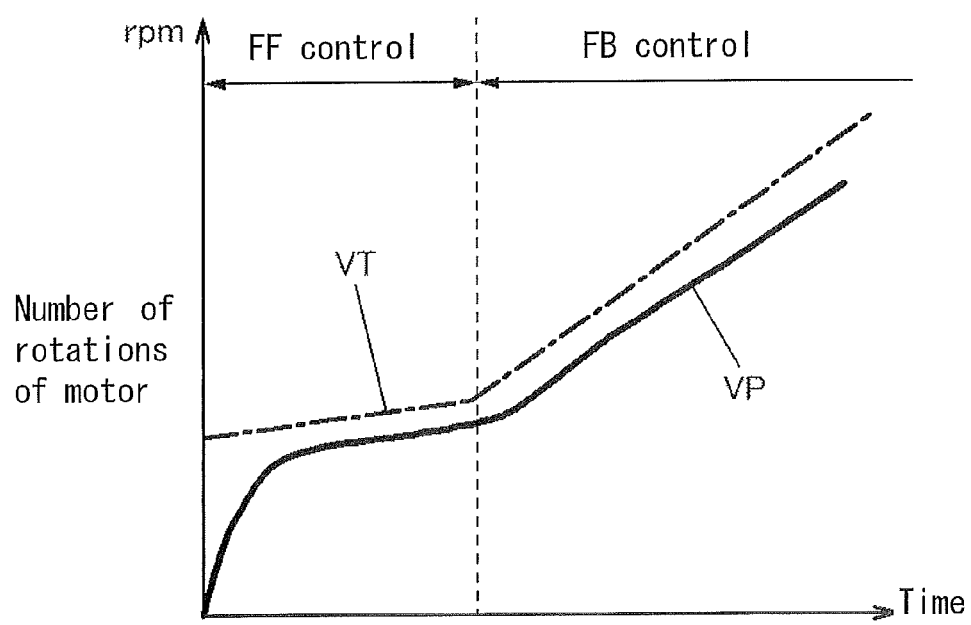

According to the embodiment, the main control portion 1 executes the feedforward control until the driven object is displaced by the predetermined initial displacement amount MV from the operation starting position thereof. Then, the main control portion 1 executes the feedback control after the driven object is displaced so as to exceed the initial displacement amount MV. Illustrated in FIG. 11A is an example of the actual number of rotations VP of the motor 30 to be obtained in the case where the feedback control is executed immediately after the motor 30 is started. On the other hand, illustrated in FIG. 11B is an example of the actual number of rotations VP of the motor 30 when the feedforward control and the feedback control are executed relative to the target number of rotations VT, which is the same as the target number of rotations VT used in FIG. 11A. As illustrated in FIG. 11A, in the case where the feedback control is executed immediately after the motor 30 is driven, a great hunting occurs at the actual number of rotations VP. Specifically, in the case where the rotational sensor 31 having the low resolution capacity is used as in this embodiment, the great hunting is more likely to be generated at the actual number of rotations VP. The great hunting may need some time to cease. On the other hand, in the case where the feedforward control is executed when the motor 30 is started, the actual number of rotations VP favorably follows the target number of rotations VT as illustrated in FIG. 11B without being influenced by the detection result of the rotational sensor 31 having the low resolution capacity.

A process of a motor control achieving the above-mentioned various functions will be described below with reference to flowcharts illustrated in FIGS. 12 to 16. In this embodiment, a speed control executed by the ECU 10 is achieved by, for example, the CPU 11 repeatedly executing a series of processes illustrated in FIG. 12 every calculation cycle. In this embodiment, the calculation cycle is set to 5 milliseconds (5 ms) for example. At the beginning of each calculation cycle, it is determined whether or not the current repetitive process is an initial calculation (step S1). The ECU 10 executes a speed control program of the motor 30 in response to a command sent thereto from the controller 50, which controls the ECU 10. The process executed at step S1 is a determination whether or not it is immediately after the ECU 10 starts executing the speed control program in response to the command from the controller 50. As described below, in a case where the ECU 10 determines that the current repetitive process is the initial calculation (Yes in S1), an initial value setting process is executed in step S2. Accordingly, the process executed in step S1 corresponds to a determination of whether or not the initial value setting is completed.

For example, a deceleration starting flag F is set in a off-state and the target number of rotations VT is set as the initial value (e.g. 1000 rpm) in the initial value setting process executed in step S2. In a case where the driven object is stopped while the previous speed control is executed (i.e. in the previous calculation cycle), the position where the driven object is stopped is memorized in a storage portion such as a resister and a memory of the CPU 11, so that a positional information of the driven object is read out from the storage portion. The read out positional information includes a position of the driven object when the operation is started, i.e. the displacement starting position SP. Additionally, the target number of rotations VT is memorized at the program memory 12, other resistor, other memory or the like. After the initial value setting is completed (in the case where the initial value setting has already been completed), the ECU 10 obtains a current number of rotations VP (the actual number of rotations) of the motor 30, a current position PP of the driven object and a value of the power voltage BV (step S3). The current position PP of the driven object corresponds to the displacement starting position SP at the initial calculation.

Then, the ECU 10 determines whether or not the current position PP of the driven object is a position exceeding the initial displacement amount MV (step S4). More specifically, the ECU 10 determines that the driven object is displaced more than by the initial displacement amount MV (No in step S4) in a case where the current position PP exceeds a value, which is obtained by adding the initial displacement amount MV to the displacement starting position SP. Hence, the determination in step S4 is conducted by using the initial displacement amount MV, the displacement starting position SP and the current position PP, as illustrated in FIG. 12. On the other hand, in a case where the driven object is not displaced more than by the initial displacement amount MV (Yes in step S4), the target number of rotations VT is increased only by a first increasing amount A1 (step S8). Then, the feedforward control (the FF control) is executed in step S10. The first increasing amount A1 may be set as, for example, +4 rmp/5 ms (where 5 ms indicates the calculation cycle).

Figure 13:
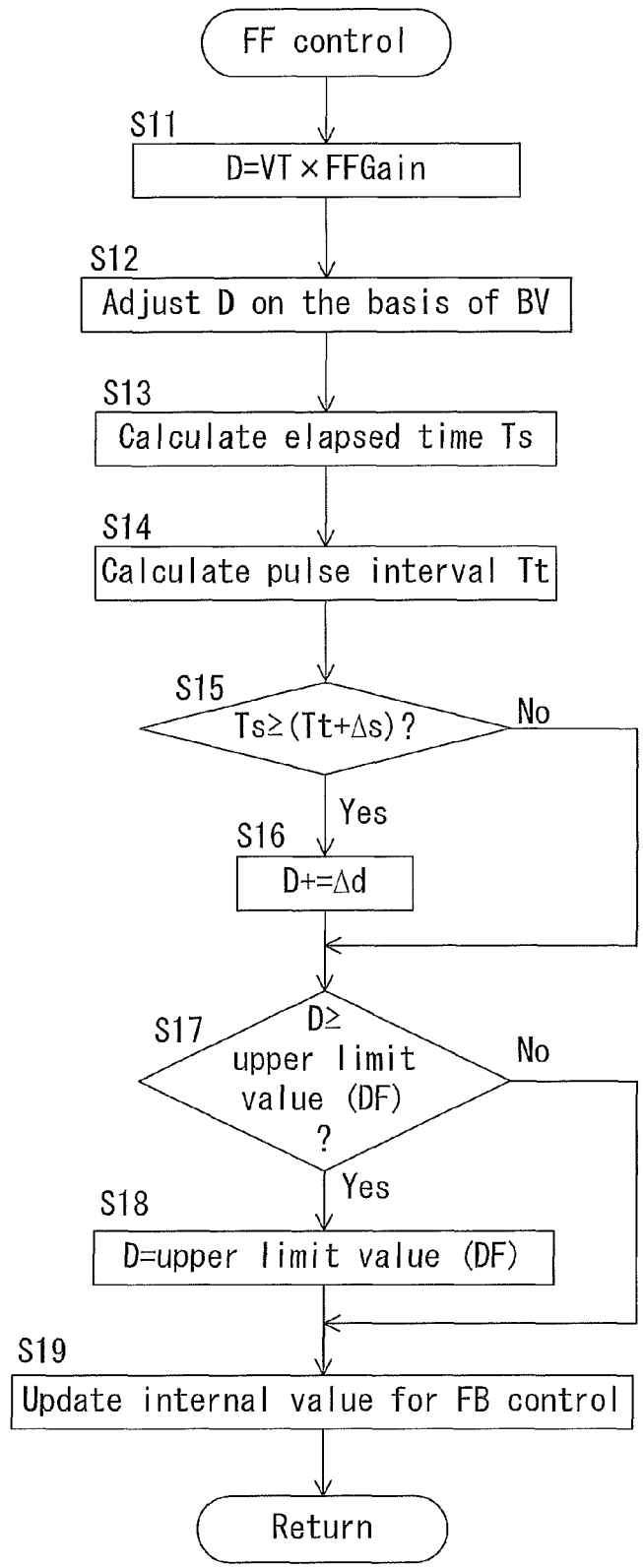
FIG. 13 is a flowchart illustrating a feedforward control, which is executed as one of subordinate processes.

The feedforward control executed in step S10 is performed along the processes indicated in FIG. 13. Firstly, the duty ratio D of the PWM control is calculated (step S11). In this embodiment, the duty ratio D is obtained in a manner where the target number of rotations VT is multiplied by a proportional gain (FF gain) of the feedforward control. Accordingly, the duty ratio D is calculated as a value of a standard power voltage (e.g. 12V). Then, the duty ratio D is adjusted in step S12 on the basis of the power voltage BV, which is obtained in the process executed in step S3. Following step S12, the elapsed time Ts from the previous pulse update is calculated in step S13 on the basis of graphs illustrated in FIGS. 6 and 7, as described above. Then, the pulse interval Tt to be obtained in the case where the motor 30 is driven on the basis of the current target number of rotations VT is calculated (step S14). In the next step (step S15), the ECU 10 determines whether or not the elapsed time Ts since the pulse update is equal to or greater than the value, which is obtained by adding the predetermined allowance value Δs to the predetermined pulse interval Tt. In a case where the above-mentioned condition is satisfied (Yes in step S15), the ECU 10 determines that a delay occurs in the rotation of the motor 30 and increases the duty ratio D by the predetermined value Δd (step S16).

For example, when assuming the elapsed time Ts corresponding to the period of time PC, which is used as a reference for the stop determination portion 5 determining that the motor 30 turns to be in the stopped state, is set to 300 ms, the calculation is repeatedly executed for 60 times in 300 ms in the case where the calculation cycle is set to 5 ms. The predetermined value Δd is set as a value by which the duty ratio D reaches 100 percent from the control starting duty ratio DHS obtained when the motor 30 is driven by the high voltage (see FIG. 4) in the 60 times of the calculation. For example, in a case where the control starting duty ratio DH is set to 10 percent, the predetermined value Δd is set to 1.5 percent (=90%/60 calculation times). Additionally, in reality, a maximum value of the duty ratio D is set as an upper limit value DF. The upper limit value DF may be set as a value of the duty ratio D in a range from 85 percent to 95 percent. However, the upper limit value DF is set as a value equal to or lower than the upper limit duty ratio DL used in the duty control executed by the restriction portion 3. More specifically, the upper limit value DF is preferably set as a value of the duty ratio D in 85 percent. When the duty ratio D, which is increased in the process executed in step S16, becomes equal to or greater than the upper limit value (Yes in step S17), the duty ratio D is set to the upper limit value DF (step S18). However, in order to prepare for the feedback control, which is executed following the feedforward control, the duty ratio D calculated in step S16 is updated as an internal value for the feedback control (step S19).

The process executed in step S8 of increasing the target number of rotations VT by the first increasing amount A1 and the feedforward control executed in step S10 following the step S8 are executed mainly by the acceleration portion 2. Specifically, the process in step S8 is a typical and main process executed by the acceleration portion 2. The main control 1 executes the feedforward control in step S10 in cooperation with the acceleration portion 2 in order to drive and control the motor 30 by using the set duty ratio D.

In the case where the ECU 10 determines that the driven object has completed the displacement by the initial displacement amount MV in step S4 (No in step S4), the upper limit number of rotations VL of the target number of rotations VT is calculated on the basis of the current position PP of the driven object (step S5). The calculation executed in step S5 may be achieved mathematically by using a formula. Alternatively, the calculation executed in step S5 may be achieved by referring to a map, a table or the like stored within the program memory 12 or other storage portion. Then, in the following step (step S6), the ECU 10 determines whether to execute the acceleration portion 2-centered control (i.e. the conclusion is negative (No) in step S6), or to turn on a deceleration flag F and execute the deceleration portion 4-centered control (i.e. the conclusion is positive (Yes) in step S6). The above-mentioned feedforward control is the acceleration portion 2-centered control. Therefore, the process executed in step S6 may be considered as a determination of whether to continuously execute an acceleration phase or to shift to a deceleration phase.

In a case where the ECU 10 determines that the target number of rotations VT does not reach the upper limit number of rotations VL and the deceleration starting flag F is not turned on in step S6 (No in step S6), the process proceeds to the next step S7. In step S7, the ECU 10 determines whether or not the current duty ratio D (the duty ratio D determined in the previous repetitive process) reaches the upper limit duty ratio DL. The upper limit duty ratio DL is set so that the PWM output has, for example, a duty cycle of 90 percent. In a case where the duty ratio D reaches the upper limit duty ratio DL (Yes in step S7), the restriction control is executed in step S40 via the process in step S9b. On the other hand, in a case where the duty ratio D does not reach the upper limit duty ratio DL (No in step S7), the feedback control (the FB control) is executed in step S20 via the process in step S9a. Additionally, the determination in step S6 may be executed on the basis of a condition of "the actual number of rotations VP not reaching the upper limit number of rotations VL" instead of the condition of "the target number of rotations VT not reaching the upper limit number of rotations VL".

The feedback control executed in step S20 will be described in detail below. In the case where the ECU 10 determines that the duty ratio D is lower than the upper limit duty ratio DL (No in step S7), the target number of rotations VT is increased by a second increasing amount A2 in step S9a and then, the feedback control (the FB control) is executed in step S20. The second increasing amount A2 may be set as a value greater than the first increasing amount A1 used in the feedforward control, e.g. the second increasing amount A2 may be set as +10 rmp/5 ms. Furthermore, as described above with reference to FIG. 5, the motor 30 may be speeded up by increasing the target number of rotations VT by a third increasing amount (+15 rmp/5 ms) in response to the position (the reached position) of the driven object. The motor 30 normally rotates even when the control is shifted to the feedback control. Therefore, the motor 30 may be rotated more stably than when the motor 30 is started to rotate.

Figure 14:
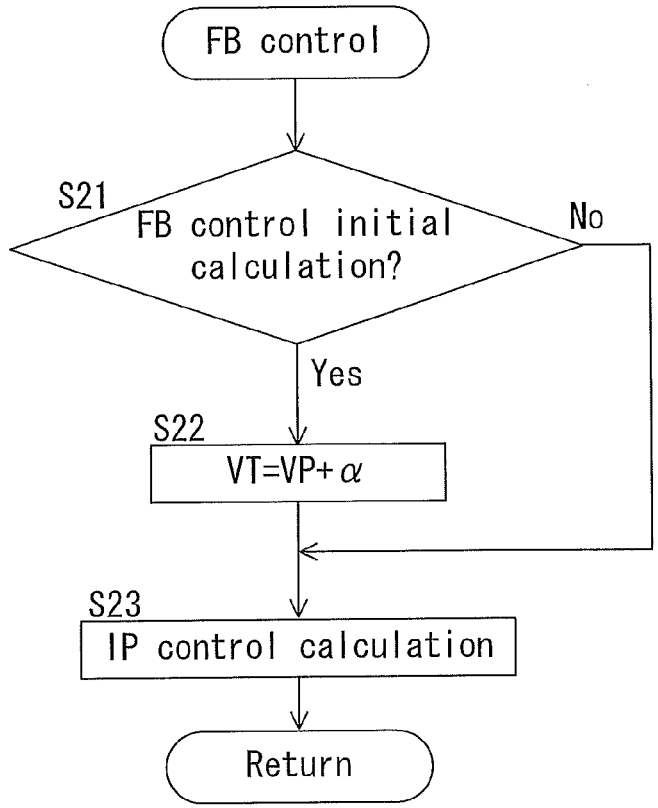
FIG. 14 is a flowchart illustrating a feedback control, which is executed as one of the subordinate processes.

The feedback control executed in step S20 is performed following the processes illustrated in FIG. 14. Firstly, the ECU 10 determines whether or not the current calculation is an initial calculation in the feedback control, in other words, whether or not the current calculation is executed in the calculation cycle when the control is shifted from the feedforward control to the feedback control (step S21). In a case where the ECU 10 determines that the current calculation is the initial calculation in the feedback control (Yes in S21), the target number of rotations VT is updated to a value, which is obtained by adding the offset value α to the current number of rotations VP (step S22). As described above with reference to FIGS. 8 to 10, the process in step S22 is executed in order to smoothly shift the control from the feedforward control to the feedback control. Once the target number of rotations VT is set, a proportional integral control calculation (IP control calculation), which is known in the control engineering, is executed in step S23, so that the motor 30 is driven on the basis of the determined duty ratio D.

The process executed in step S9a of increasing the target number of rotations VT only by the second increasing amount A2 and the feedback control executed in step S20 following step S9a are executed mainly by the acceleration portion 2. Specifically, the process executed in step S9a is a typical and main process executed by the acceleration portion 2. The main control portion 1 executes the feedback control in step S20 in cooperation with the acceleration portion 2 in order to control the drive of the motor 30 on the basis of the determined duty ratio D.

Figure 15:
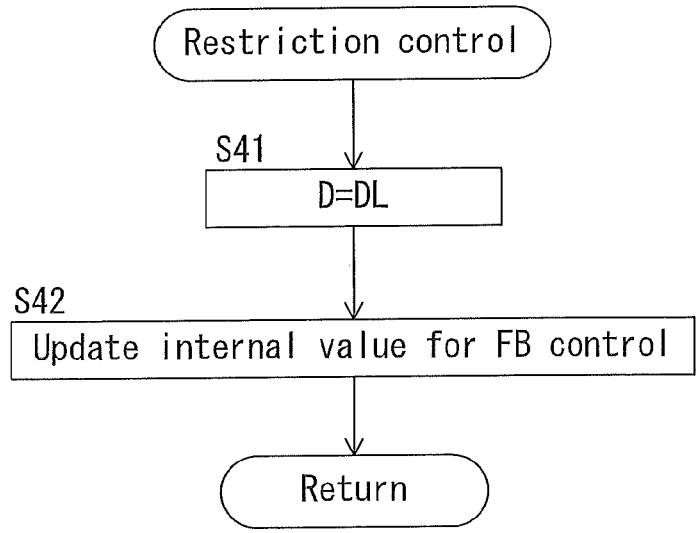
FIG. 15 is a flowchart illustrating a restriction control, which is executed as one of the subordinate processes.

In a case where the ECU 10 determines that the duty ratio D is equal to or greater than the upper limit duty ratio DL in step S7 (Yes in step S7), the target number of rotations VT is fixed at the current number of rotations VP in step S9b and then, the restriction control is executed in step S40. As described above with reference to FIGS. 3 and 4, the restriction control in step S40 is continuously executed until the current number of rotations VP reaches the upper limit number of rotations DL, which is set so as to decrease as the displacement amount of the driven object from the reference position becomes great. More specifically, the duty ratio D is set to the upper limit duty ratio DL as illustrated in FIG. 15 (step S41). Additionally, the duty ratio D is updated as the internal value for the feedback control in order to prepare for the feedback control executed while the motor 30 is decelerated after the current number of rotations VP reaches the upper limit number of rotations DL (step S42). Accordingly, the processes executed in steps S40, S41 and S42 may be considered as a restriction phase in the acceleration phase.

The processes following step S7 in FIG. 12 are executed mainly by the acceleration portion 2. However, the process in step S9b and the process in step S40 following step S9b are executed mainly by the restriction portion 3, which executes the processes in cooperation with the acceleration portion 2. Specifically, the process in step S9b and the process in step S41 are typical and main control executed by the restriction portion 3. The main control portion 1 drives and controls the motor 30 on the basis of the determined duty ratio D in cooperation with the acceleration portion 2 and the restriction portion 3. The restriction control in step S40 is executed only in the case where the duty ratio D reaches the upper limit duty ratio DL in the acceleration phase. Therefore, because a constant speed phase is not always included in the acceleration phase, the rotational speed of the motor 30 is sufficiently increased by the time when the motor 30 is capable of rotating faster, so that the displacement operation of the driven object may be completed in a short period of time.

In a case where the deceleration flag F is in the on-state or in the case where the target number of rotations VT is equal to or greater than the upper limit number of rotations VL in step S6 illustrated in FIG. 12 (Yes in step S6), the deceleration portion 4-centered control is executed. In other words, the phase shifts to the deceleration phase from the acceleration phase. In this case, firstly, the deceleration flag F is set to be in the on-state (step S31). In a case where the deceleration flag F has already been turned on, the deceleration flag F is set to the on-state again. Then, the ECU 10 determines whether or not the target number of rotations VT needs to be continuously decreased (step S32). More specifically, because the target number of rotations VT is decreased by a predetermined decelerating amount B every calculation cycle by the restriction control, the ECU 10 determines whether or not the target number of rotations VT is equal to or greater than a deceleration ending value (a terminal value of ending the deceleration control) in the case where the decelerating amount B is subtracted from the target number of rotations VT (step S32). The deceleration ending value may be set as the final steady number of rotations VE (see e.g. FIGS. 2 and 5). The final steady number of rotations VE may be set as, for example, 1200 rmp in this embodiment. Furthermore, the ECU 10 may additionally determine whether or not the duty ratio D is equal to or greater than the lower limit value (e.g. the duty ratio D of 5 percent) in step S32. In a case where the decelerating amount B is subtractable from the target number of rotations VT and the duty ratio D is equal to or greater than the lower limit value (Yes in step S32), the predetermined decelerating amount B is subtracted from the target number of rotations VT (step S36). The decelerating amount B may be set as, for example, −19 rpm/5 ms.

Figure 16:
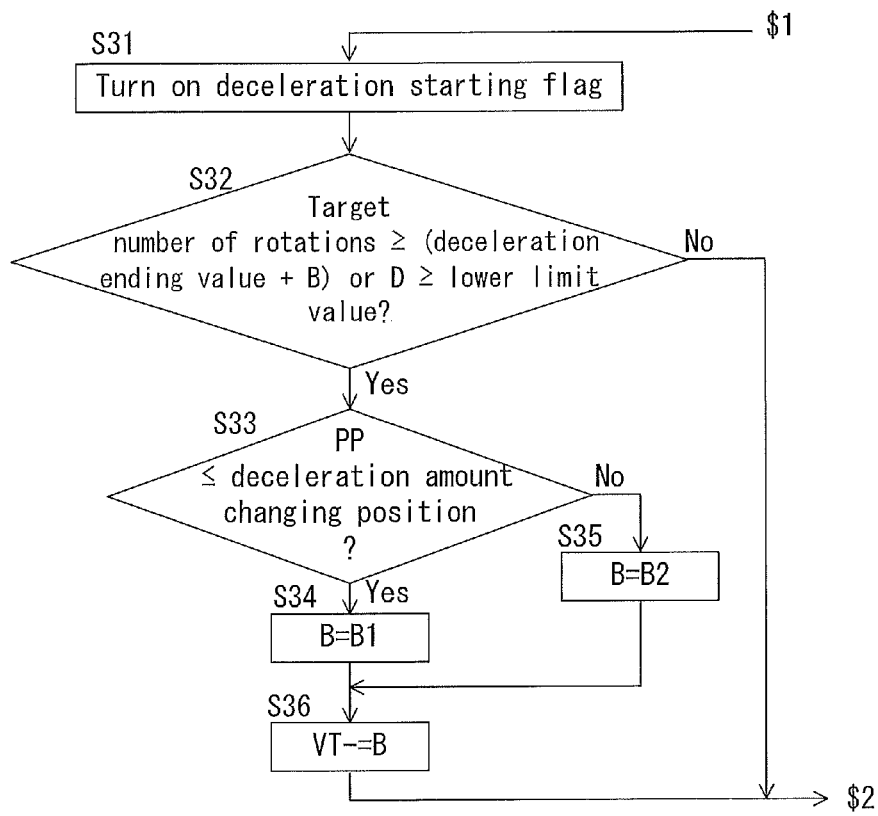
FIG. 16 is a flowchart illustrating another example of some of processes illustrated in FIG. 12.

Additionally, as described above with reference to FIG. 5, the decelerating amount B does not need to be a constant value. For example, the decelerating amount B may be set so as to change in multiple stages. In this case, the series of steps starting from S1 and ending S2 in FIG. 12 is replaced by processes illustrated in FIG. 16. For example, as illustrated in FIG. 16, the ECU 10 determines whether or not the current position PP is found on a position not exceeding the position to be reached when the decreasing ratio (the decreasing amount) of the target number of rotations VT is changed (i.e. a decreasing amount changed position) in step S33 following step S32. In the case where the current position PP of the driven object is found on the position not exceeding the decreasing amount changed position (Yes in step S32), a value B1 is set as the decelerating amount B (step S34). On the other hand, in a case where the current position PP is found on the position exceeding the decreasing amount changed position (No in step S33), a value B2 is set as the decelerating amount B2 (step S35). For example, the decelerating amount B1 may be set as −19 rmp/5 ms and the decelerating amount B2 may be set as −25 rpm/5 ms. The greater the displacement amount of the driven object becomes, the more the user may feel the speed reduction of the driven object. Additionally, in a case where the rotational speed of the motor 30 is increased in multiple stages on the basis of the increasing amount A3 in addition to the increasing amount A2, processes similar to the processes illustrated in FIG. 16 are executed in order to achieve smooth shift of the control from the feedforward control to the feedback control.

In the case where the target number of rotations VT is set in step S36, the feedback control is executed in step S20. Then, as described above with reference to FIG. 14, the known IP control calculation is executed in step S23, so that the motor 30 is driven on the basis of the determined duty ratio D. Additionally, the control shift from the feedforward control to the feedback control has already been (most likely) completed by the time when the deceleration process is executed. Therefore, in this case, the process in step S22 is not executed and the IP control calculation is executed in step S23 after the determination in step S21.

The series of processes from step S31 to step S20 including step S36 where the target number of rotations VT is decreased by the decreasing amount B are executed mainly by the deceleration portion 4. Specifically, the process executed in step S36 is a typical and main process executed by the deceleration portion 4. The main control portion 1 executes the feedback control in step S20 in cooperation with the deceleration portion 4 in order to control the drive of the motor 30 on the basis of the determined duty ratio D. When the target number of rotations VT reaches the final steady number of rotations VE, a narrow-defined deceleration phase is completed. Therefore, the processes to be executed after the target number of rotations VT reaches the final steady number of rotations VE may be considered as a steady operation phase (a constant speed phase). However, because the feedback control executed in step S20 is continued until the motor 30 stops, the processes to be executed after the target number of rotations VT reaches the final steady number of rotations VE may be considered as a continuation of the deceleration phase. In other words, it may be considered that the deceleration phase where the deceleration amount is zero (0) is continued. Additionally, the target number of rotations VT may be set so as to, for example, decrease down to the displacement completing position EP by a deceleration amount of approximately −2 rpm/5 ms instead of fixing the target number of rotations VT at the final steady number of rotations VE.

In this embodiment, the increasing amount in the acceleration phase and the decreasing amount in the deceleration phase stepwisely or continuously change in response to a position of the driven object. However, the increasing amount in the acceleration phase and the decreasing amount in the deceleration phase may be changed in response to the elapsed time. Furthermore, in this embodiment, the cases where the driven object is slowly started and where the driven object is slowly stopped are described. However, the motor 30 may be driven at a maximum duty ratio from the start by setting the initial number of rotations VE at a high value without performing the slow start of the driven object. Still further, in the above-described embodiment, the case where the slow stop of the driven object is executed in order to ease the shock to be generated when the driven object reaches the displacement completing position EP, is described. However, in a case where the shock does not cause an issue or in a case where the shock is not likely to be generated due to a structure of the driven object and the like, the slow stop of the driven object does not need to be performed. In this case, for example, the upper limit number of rotations VL may be set as a great value, so that the slow stop of the driven object is not substantially performed.

A vehicle seat apparatus 20, which will be hereinafter referred to as a seat 20, may be adapted as the driven object of the motor control device according to the embodiment. As illustrated in FIGS. 17A to 19, the seat 20 includes a head rest 21, a seat back 22 and a seat cushion 23. The head rest 21 supports a head region of an occupant seated on the seat 20. The seat back 22 serves as a backrest having a supporting surface 22a facing a back of the occupant for supporting the occupant at the back when being seated on the seat 20. The seat cushion 23 faces a buttocks region of the occupant for supporting the buttocks region of the occupant when being seated on the seat 20. A surface facing opposite from the support surface 22a of the seat back 22 (i.e. a back surface 22b) faces a luggage room 9 of a vehicle 100. In other words, the seat 20 is adapted as a seat in a rearmost row, so that a back surface 22b of the seat back 22 defines a portion of the luggage room 9. In a case where the seat 20 is adapted to a car having seats in two rows, the seat 20 is arranged in a second row. Furthermore, in a case where the seat 20 is adapted to a car having seats in three rows, the seat so is arranged in a third row.

The seat 20 is configured so that a posture thereof is changeable between a seating state for allowing the occupant to sit thereon and a stored state for enlarging the luggage room 9. The luggage room 9 expands rearwardly of the seat 20. Therefore, the luggage room 9 is enlarged by turning the seat 20 to be in the stored state, so that a luggage loading capacity of the vehicle 100 is increased. The seat 20 may be stored in various forms. As a general storage state of the seat 20, the seat 20 may be folded so that the support surface 22a of the seat back 22 faces the seat cushion 23 as illustrated in FIG. 17B. The seat 20 may be configured so as to be stored in a storage space in a recessed shape formed on a floor of the luggage space 9 while the seat 20 is folded. Furthermore, as illustrated in FIGS. 18a to 18d in series, the seat 20 may be configured so that the seat cushion 23 is slid under a floor 9f of the luggage room 9 and the seat back 22 is tilted to a position where the seat cushion 23 is positioned while the seat 20 is in the seating state. In this case, the seat back 22, which stands upwardly while the seat 20 is in the seating state, is tilted so that the back surface 22b is substantially at the same level as the floor 9f of the luggage space 9 in order to enlarge the luggage space 9.

Figure 17A:
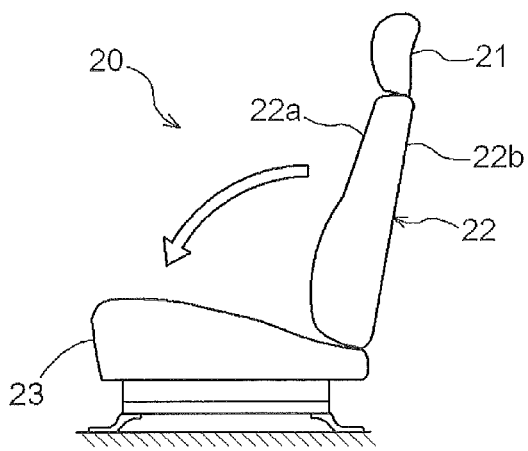
FIGS. 17A and B are diagrams illustrating one example of a posture change of a vehicle seat.
Figure 17B:
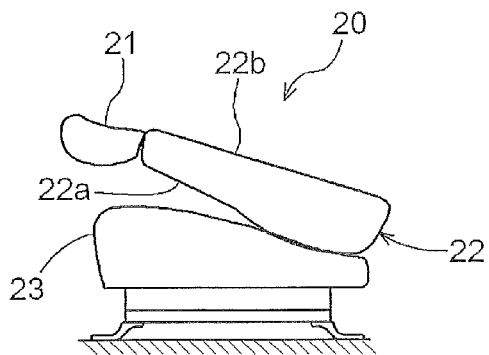
Figure 18A:
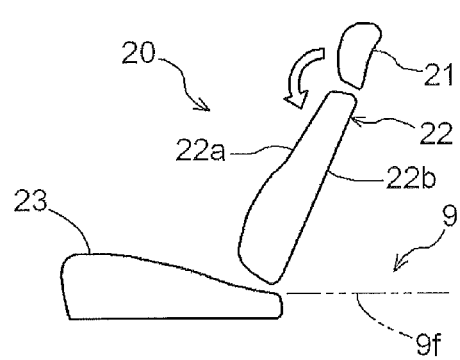
FIGS. 18A, 18B, 18C and 18D are diagrams illustrating another example of the posture change of the vehicle seat.
Figure 18B:
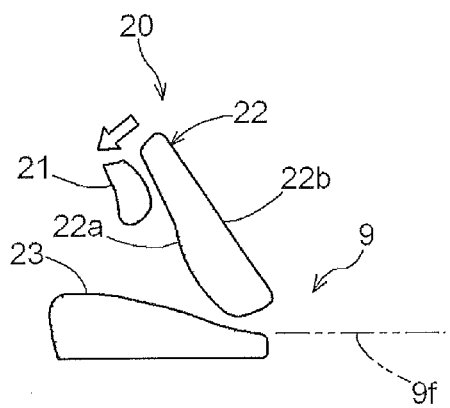
Figure 18C:
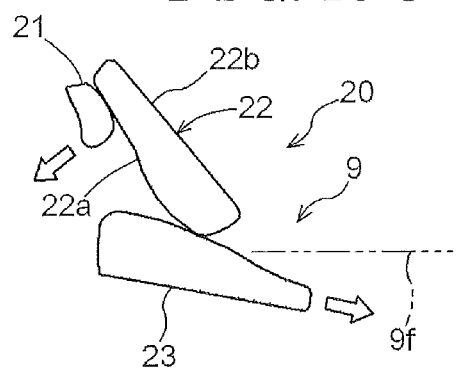
Figure 18D:
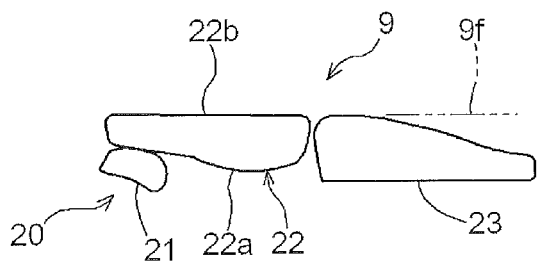

The seat 20 may be configured as an electric seat, so that the seat back 22 illustrated in FIGS. 17A and 17B, and at least the seat back 22 and the seat cushion 23 illustrated in FIGS. 18A to 18D are driven by respective motors. In other words, the seat back 22, the seat cushion 23 and the like correspond to the driven objects according to the embodiment. For example, the seat back 22 is more likely to be angled by the occupant and a position (the displacement starting position SP) of the seat back 22 when a storage operation of the seat 20 is started may vary. However, the seat 20 is preferably stored while the seat back 22 and the seat cushion 23 may preferably be moved in unity until the seat 20 is stored. Accordingly, the above-described control may be adapted in order to store the seat 20 while moving the seat back 22, the seat cushion 23 and the like in unity. Furthermore, in a case where the seat back 22 is folded, the seat back 22 needs to be forwardly inclined until the seat back 22 reaches a mechanical end point. However, in this case, the seat back 22 may preferably reach the mechanical end point while a moving speed thereof is sufficiently decelerated, so that a shock is not generated when the seat back 22 reaches the mechanical end point. Accordingly, the above-described control may be adapted to the seat 20. The same folds for the seat cushion 23, the head rest 21 and the entire seat 20.

Figure 19:
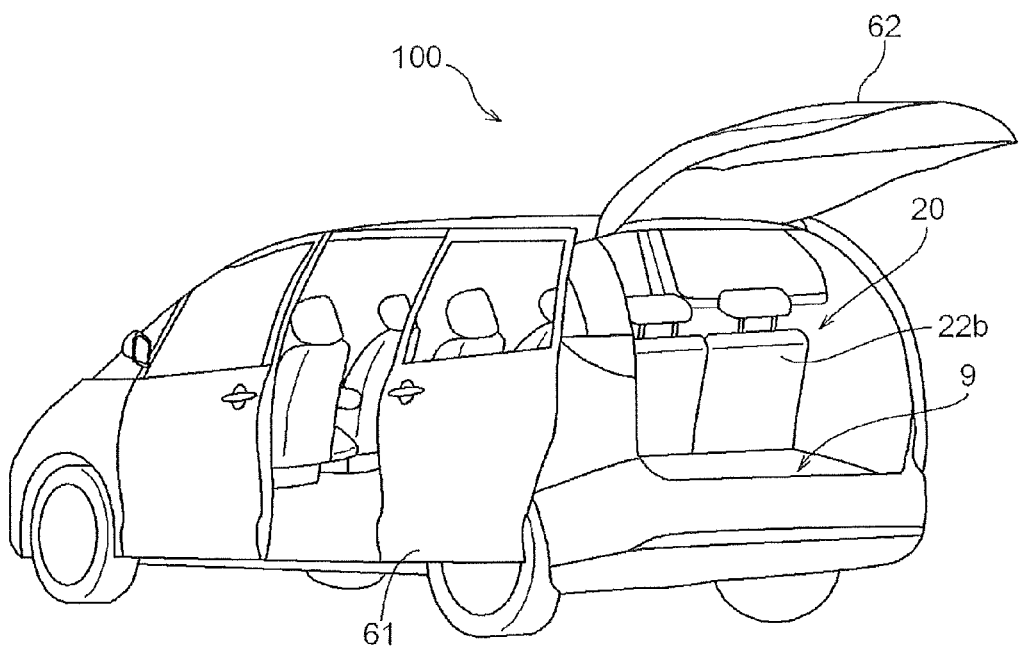
FIG. 19 is a perspective view illustrating one example of a vehicle.

An electric slide door 61 and an electric back door 62 of the vehicle 100 illustrated in FIG. 19 may be adapted as the driven objects of the motor control device according to the embodiment. Furthermore, the electric door of the building and the like may be adapted as the driven object of the motor control device according to the embodiment.

According to the embodiment, the motor control device, which completes a series of movements of the driven objects from the start of the operation to the completion of the operation in a short time while plural driven object are moved in unity without being influenced by the operation starting positions of the respective driven objects and which has a strong resistance against an operation environment such as a deterioration of the driven objects over time, an ambient temperature, a power voltage fluctuation and the like, may be achieved.

Accordingly, the target number of rotations VT is increased until the target number of rotations VT of the motor 30 reaches the upper limit number of rotations VL. Therefore, the target number of rotations VT is appropriately set so that the time for completing the series of operation of the driven object is shortened by increasing the rotational speed of the motor 30 on the basis of the target number of rotations VT. Furthermore, the target number of rotations VT is decreased after the target number of rotations VT of the motor 30 reaches the upper limit number of rotations VL. Therefore, the target number of rotations VT is appropriately set so that the shock and the like generated when the driven object is stopped is avoided by decreasing the rotational speed of the motor 30 on the basis of the target number of rotations VT. The main control portion 1 drives and controls the motor 30 on the basis of the target number of rotations VT. Accordingly, the series of operation of the driven object from the start of the operation to the completion of the operation may be completed in a short period of time, and further, a mechanical discomfort such as the shock to be generated when the driven object is operated may be avoided. Furthermore, the upper limit number of rotations VL is set on the basis of the position (the reached position) of the driven object from the reference position. Therefore, the displacement of the driven object from the start of the operation to the completion of the operation may be performed in unity without being influenced by the displacement starting position of the driven object. Still further, because the upper limit number of rotations VL is set on the basis of the position (the reached position) of the driven object from the reference position, a timing of accelerating and decelerating the rotational speed of the motor 30 is less likely to be influenced even if a maximum speed of the motor 30 is decreased because of the deterioration of the driven object, the motor 30 and the like, influence of operation environment such as the ambient temperature, the power voltage fluctuation and the like. In other words, the series of operations of the driven object from the start of the operation to the completion of the operation are performed in unity in a similar manner without being influenced by a duration time of the operation for completing the displacement of the driven object, which may occur due to the deterioration of the driven object, the motor 30 and the like occurring over time, the operation environment and the like. Therefore, the user may not feel discomfort while the driven object is being operated. Accordingly, the motor control device having a strong resistance against the operation environment may be achieved.

According to the embodiment, the upper limit number of rotations VL is set as the value, which decreases as the displacement amount of the driven object from the reference position increases. Furthermore, the deceleration portion 4 decreases the target number of rotations VT on the basis of the upper limit number of rotations VL.

According to the embodiment, the upper limit number of rotations VL is set as a value, which decreases as the displacement amount of the driven object from the reference position increases and includes the final steady number of rotations VE as the minimum value, by which the motor 30 is rotated in a constant speed. Furthermore, the deceleration portion 4 decreases the target number of rotations VT on the basis of the upper limit number of rotations VL.

In the case where the upper limit number of rotations VL is set as a value decreasing as the displacement amount of the driven object from the reference position increases, the upper limit number of rotations VL may be set as a small number of rotations even in the case where a point where the number of rotations of the motor 30 reaches the upper limit number of rotations VL is found in a final phase of the displacement. Therefore, the target number of rotations VT may be easily decreased down to the final steady number of rotations VE. As a result, the target number of rotations VT may easily and smoothly be shifted to the increase control from the decrease control thereof. Furthermore, the deceleration portion 4 decreases the target number of rotations VT on the basis of the upper limit number of rotations VL, so that a changing ratio of the upper limit number of rotations VL corresponds to a decreasing ratio of the target number of rotations VT by the deceleration portion 4. As a result, changes in the target number of rotations VT may easily and smoothly be shifted from an increase to a decrease at any timing without being influenced by the position (the reached position) of the driven object.

According to the embodiment, the upper limit number of rotations VL is decreased by the decreasing ratio, which is set so as to continuously or stepwisely increase as the displacement amount of the driven object from the reference position increases.

Accordingly, the upper limit number of rotations VL may quickly decrease as the displacement amount of the driven object from the reference position increases. As a result, the user may feel more of the deceleration of the driven object when the driven object completes the displacement.

According to the embodiment, the motor control device further includes the restriction portion 3 for restricting the rotation of the motor 3 in response to the allowable output of the motor 30, wherein the restriction portion 3 restricts the increase of the target number of rotations VT by the acceleration portion 2 and sets the target number of rotations VT to the number of rotations VP of the motor 30 in the case where the output of the motor 30 reaches the allowable output.

In the case where the power voltage is low or in the case where the load applied to the motor 30 increases, the output of the motor 30 may not follow the target number of rotations VT that increases. However, according to the embodiment, because the target number of rotations VT is set to the actual number of rotations VP of the motor 30, the motor 30 may be allowed to exert its function at a maximum level within the allowable range until the restriction portion 3 determines that the target number of rotations VT (i.e. the actual number of rotations VP) exceeds the upper limit number of rotations VL and starts the deceleration control. As a result, even if the restriction control is executed, the operation of the driven object may be completed in a short period of time.

According to the embodiment, the main control portion 1 executes the pulse width modulation in order to control the motor 30. The restriction portion 3 determines that the output of the motor 30 reaches the allowable output in the case where a duty ratio D of the pulse width modulation becomes equal to or greater than the upper limit duty ratio DL and sets the duty ratio D of the pulse width modulation to the upper limit duty ratio DL.

Accordingly, because the duty ratio D of the pulse width modulation is substantially set at the upper limit duty ratio DL, the operation of the driven object may be completed in a possible short period of time even if the restriction control is executed.

According to the embodiment, the main control potion 1 executes the pulse width modulation in order to control the motor 30. Furthermore, the main control portion 1 executes the feedforward control until the driven object is displaced by the predetermined initial displacement amount MV since the driven object is started to be driven and executes the feedback control after the driven object is displaced more than the initial displacement amount MV. The control portion 1 increases the duty radio D of the pulse width modulation by the predetermined amount every calculation cycle in the feedforward control in the case where the number of rotations VP of the motor 30 is lower than the target number of rotations VT.

Accordingly, because, basically the actual number of rotations VP (the rotational speed) of the motor 30 is not referred to in the feedforward control, the actual number of rotations VP of the motor 30 may greatly differ from the target number of rotations VT. However, according to the embodiment, because the adjustment process of increasing the duty ratio D of the pulse width modulation by a predetermined amount every calculation cycle, the difference between the target number of rotations VT and the actual number of rotations VP of the motor 30 may be cleared.

According to the embodiment, the main control portion 1 increases the duty ratio D of the pulse width modulation in the case where the difference between the target number of rotations VT and the number of rotations VP of the motor 30 becomes equal to or greater than the allowable difference.

Accordingly, because the allowance difference is set, a false adjustment process may be avoided even if a measurement accuracy (e.g. the resolution capacity and the like) of the motor 30 is low. Furthermore, the motor control device is configured so as to have a resistance against a noise and the like, the false adjustment process may be further avoided.

According to the embodiment, the motor control device further includes the stop determination portion 5 for determining whether or not the motor 30 is in the stopped state on the basis of the number of rotations VP of the motor 30, wherein the predetermined amount added to the duty ratio D of the pulse width modulation is set as the increasing amount, by which the duty radio D to be obtained when the motor 30 is started reaches 100 percent during the period of time from when the main control portion 1 determines that the number of rotations VP is lower than the target number of rotations VT by a predetermined amount to when the stop determination portion 5 determines that the motor 30 is in the stopped state.

In the case where the number of rotations of the motor 30 is low relative to the target number of rotations VT, other objects or components may contact or be caught in the driven object and the displacement of the driven object may be interrupted. Furthermore, the load applied to the driven object, the motor 30 and the like may increase because of influences of mechanical annual changes of the driven object, the motor 30 and the like and the operation environment. In the case where the load applied to the driven object, the motor 30 and the like increases because of the influence of the mechanical annual changes thereof and the operation environment, the adjustment is preferably executed as quickly as possible in order to increase the output of the motor 30. On the other hand, in a case where the displacement of the driven object is interrupted because of dust, a trash and the like, the interruption of the displacement of the driven object may be cleared by increasing the output of the motor 30. According to the embodiment, the duty ratio D is increased by the increasing amount, by which the duty ratio D reaches 100 percent before the stop determination portion 5 determines the stopped state of the motor 30. As a result, the output of the motor 30 may be increased as much as possible before the stopped state of the motor 30 is determined.

According to the embodiment, the main control portion 1 executes the pulse width modulation in order to control the motor 30. Furthermore, the main control portion 1 executes the feedforward control until the driven object is displaced by the predetermined initial amount MV from the position SP of the driven object located when the motor 30 is started and executes the feedback control after the driven object is displaced more than the initial displacement amount MV. The main control portion 1 updates the target number of rotations VT to the value, which is obtained by adding the predetermined offset value α to the number of rotations of the motor 30 to be generated at a point of time when the control is shifted from the feedforward control to the feedback control, when the control is shifted from the feedforward control to the feedback control.

In the case where the difference between the actual number of rotations VP of the motor 30 and the target number of rotations VT is great at the point of time when the control is shifted from the feedforward control to the feedback control, the number of rotations of the motor 30 may greatly fluctuate because the difference is rapidly adjusted by the feedback control. For example, in the case where the motor 30 is driven under the low load applied thereto, the actual number of rotations VP of the motor greatly exceeds the target number of rotations VT. Therefore, in this case, the number of rotations of the motor 30 may rapidly decrease after the control is shifted to the feedback control. On the other hand, in the case where the motor 30 is driven under the high load applied thereto, the actual number of rotations VP of the motor 30 becomes lower than the target number of rotations VT. Therefore, in this case, the number of rotations of the motor 30 may rapidly increase when the control is shifted to the feedback control. The aforementioned fluctuations in the number of rotations of the motor 30 may cause a fluctuation in a movement of the driven object. Therefore, according to the embodiment, the target number of rotations VT is updated to a value, which is obtained by adding the predetermined offset value α to the number of rotations of the motor 30, when starting the feedback control. Accordingly, the fluctuation generated when the control is shifted may be avoided. As a result, the control may be smoothly shifted from the feedforward control to the feedback control. Additionally, the control delay CR is included in the feedback control between the target number of rotations VT and the actual number of rotations VP, which follows the target number of rotations VT. Therefore, the offset value α may be set on the basis of the control delay CR.

According to the embodiment, the acceleration portion 2 increases the target number of rotations VT by different increasing ratios in the case where the main control portion 1 executes the feedforward control and in the case where the main control portion 1 executes the feedback control.

For example, the feedforward control is a control to be executed when the motor 30 is started to be driven. Therefore, the feedforward control may be preferably configured so as to start the motor 30 slowly. On the other hand, the motor 30 is already rotating when the feedback control is executed. Therefore, the motor 30 may be rotated faster while the feedback control is being executed. Accordingly, the series of the operation of the driven object from the start of the operation to the completion of the operation may be completed in a short period of time in the case where the target number of rotations VT is increased by different increasing ratios between while the feedforward control is being executed and while the feedback control is being executed.

According to the embodiment, the acceleration portion 2 increases the target number of rotations VT by the increasing ratio, which is set to continuously or stepwisely increase as the displacement amount of the driven object from the reference position increases.

The motor 30 may preferably be slowly started. However, in the case where the motor 30 is already rotating, the motor 30 may be rotated even faster. The series of the operation of the driven object from the start of the operation to the completion of the operation may be completed in a short period of time in the case where the target number of rotations VT is increased by the increasing ratio, which is set so as to increase as the displacement amount of the driven object from the reference position becomes great.

According to the embodiment, the motor control device 10 is adapted as a seat control device for a vehicle and the driven object includes the vehicle seat 20.

Generally, an angle of the vehicle seat 20 is likely to be adjusted at any desired angle by the occupant. Therefore, the position at which the displacement of the vehicle seat 20 is started (i.e. the displacement starting position SP) may vary. However, the series of operations of the displacement of movable portion(s) of the seat 20 may preferably be performed in unity. Accordingly, the above-mentioned control executed by the motor control device may be adapted to the vehicle seat 20. In the case where the posture, the position and the like of the vehicle seat 20 is changed, the displacement of the vehicle seat 20 up to the mechanical end point is sufficient. However, the movable portion(s) of the vehicle seat 20 may preferably be stopped at the end point while the moving speed thereof is sufficiently decreased, so that the movable portion(s) of the vehicle seat 20 is (are) stopped without generating a shock. Accordingly, the above-described control may be adapted to the vehicle seat 20 in order to achieve the above-mentioned operation.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:

1. A motor control device comprising:
    an acceleration portion for increasing a target number of rotations of a motor every predetermined calculation cycle until the target number of rotations of the motor reaches an upper limit number of rotations, the upper limit number of rotations varying according to a reached position of a driven object from a reference position of the driven object, the driven object being driven by the motor so that a position of the driven object is changed;

a deceleration portion for decreasing the target number of rotations of the motor every calculation cycle after the target number of rotations reaches the upper limit number of rotations;

a main control portion for controlling a drive of the motor on the basis of the target number of rotations using pulse width modulation; and wherein the main control portion executes feedforward control until the driven object is displaced by a predetermined initial displacement amount and executes feedback control after the driven object is displaced more than the initial displacement amount, the main control portion increasing a duty ratio of the pulse width modulation by a predetermined amount every calculation cycle in the feedforward control when a number of rotations of the motor is lower than the target number of rotations.

2. The motor control device according to claim 1, wherein the upper limit number of rotations is set as a value, which decreases as a displacement amount of the driven object from the reference position increases, and the deceleration portion decreases the target number of rotations on the basis of the upper limit number of rotations.

3. The motor control device according to claim 2, wherein the upper limit number of rotations is decreased by a decreasing ratio, which is set so as to continuously or stepwisely increase as the displacement amount of the driven object from the reference position increases.

4. The motor control device according to claim 1, wherein the upper limit number of rotations is set as a value, which decreases as a displacement amount of the driven object from the reference position increases and includes a final steady number of rotations as a minimum value, by which the motor is rotated in a constant speed, and the deceleration portion decreases the target number of rotations on the basis of the upper limit number of rotations.

5. The motor control device according to claim 1 further comprising a restriction portion for restricting a rotation of the motor in response to an allowable output of the motor, wherein the restriction portion restricts an Increase of the target number of rotations by the acceleration portion and sets the target number of rotations to a number of rotations of the motor in a case where an output of the motor reaches the allowable output.

6. The motor control device according to claim 5, wherein the main control portion executes a pulse width modulation in order to control the motor, and the restriction portion determines that the output of the motor reaches the allowable output in a case where a duty ratio of the pulse width modulation becomes equal to or greater than an upper limit duty ratio and sets the duty ratio of the pulse width modulation to the upper limit duty ratio.

7. The motor control device according to claim 1, wherein the main control portion increases the duty ratio of the pulse width modulation in a case where a difference between the target number of rotations and the number of rotations of the motor becomes equal to or greater than an allowable difference.

8. The motor control device according to claim 1 further comprising a stop determination portion for determining whether or not the motor is in a stopped state on the basis of the number of rotations of the motor, wherein the predetermined amount added to the duty ratio of the pulse width modulation is set as an increasing amount, by which the duty radio to be obtained when the motor is started reaches 100 percent during a period of time from when the main control portion determines that the number of rotations is lower than the target number of rotations by a predetermined amount to when the stop determination portion determines that the motor is in the stopped state.

9. The motor control device according to claim 1, wherein the main control portion executes a pulse width modulation in order to control the motor, the main control portion executes a feedforward control until the driven object is displaced by a predetermined initial amount from a position of the driven object located when the motor is started and executes a feedback control after the driven object is displaced more than the initial displacement amount, the main control portion updates the target number of rotations to a value, which is obtained by adding a predetermined offset value to a number of rotations of the motor generated at a point of time when a control is shifted from the feedforward control to the feedback control, when the control is shifted from the feedforward control to the feedback control.

10. The motor control device according to claim 1, wherein the acceleration portion increases the target number of rotations by different increasing ratios in the case where the main control portion executes the feedforward control and in the case where the main control portion executes the feedback control.

11. The motor control device according to claim 1, wherein the acceleration portion increases the target number of rotations by an increasing ratio, which is set to continuously or stepwisely increase as a displacement amount of the driven object from the reference position increases.

12. The motor control device according to claim 1, wherein the motor control device is adapted as a seat control device for a vehicle and the driven object includes a vehicle seat.

13. A motor control device comprising:

an acceleration portion for increasing a target number of rotations of a motor every predetermined calculation cycle until the target number of rotations of the motor reaches an upper limit number of rotations, which is set on the basis of a reached position of a driven object from a reference position, the driven object being driven by the motor so that a position of the driven object is changed;

a deceleration portion for decreasing the target number of rotations of the motor every calculation cycle after the target number of rotations reaches the upper limit number of rotations;

a main control portion for driving and controlling the motor on the basis of the target number of rotations using pulse width modulation, wherein the upper limit number of rotations is set as a value, which decreases as a displacement amount of the driven object from the reference position increases and includes a final steady number of rotations as a minimum value, by which the motor is rotated in a constant speed, and the deceleration portion decreases the target number of rotations on the basis of the upper limit number of rotations; and wherein the main control portion executes feedforward control until the driven object is displaced by a predetermined initial displacement amount and executes feedforward control after the driven object is displaced more than the initial displacement amount, the main control portion increasing a duty ratio of the pulse width modulation by a predetermined amount every calculation cycle in the feedforward control when a number of rotations of the motor is lower than the target number of rotations.

14. A motor control device in combination with a motor that drives a driven object to change a position of the driven object, the motor control device being operatively connected to the motor and comprising:
- an acceleration portion which increases a target number of rotations of the motor every predetermined calculation cycle until the target number of rotations of the motor reaches an upper limit number of rotations, the upper limit number of rotations varying based on a displacement of the driven object from a reference position;
- a deceleration portion which decreases the target number of rotations of the motor every calculation cycle after the target number of rotations reaches the upper limit number of rotations;
- a main control portion which controls the motor based on the target number of rotations using pulse width modulation, the main control portion executing feedforward control until the driven object is displaced by a predetermined initial displacement amount and executing feedback control after the driven object is displaced more than the initial displacement amount, the main control portion increasing a duty ratio of the pulse width modulation by a predetermined amount every calculation cycle in the feedforward control when a number of rotations of the motor is lower than the target number of rotations; and
- wherein the driven object is one of an electric seat of a vehicle, a slide door of the vehicle, and a power window of the vehicle.

* * * * *